(12) United States Patent
Ueno

(10) Patent No.: US 9,816,557 B2
(45) Date of Patent: Nov. 14, 2017

(54) TAPERED ROLLER BEARING

(71) Applicant: NTN CORPORATION, Osaka (JP)

(72) Inventor: Takashi Ueno, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/896,886

(22) PCT Filed: Jun. 5, 2014

(86) PCT No.: PCT/JP2014/064977
§ 371 (c)(1),
(2) Date: Dec. 8, 2015

(87) PCT Pub. No.: WO2014/199898
PCT Pub. Date: Dec. 18, 2014

(65) Prior Publication Data
US 2016/0153495 A1 Jun. 2, 2016

(30) Foreign Application Priority Data

Jun. 10, 2013 (JP) .................................. 2013-121847

(51) Int. Cl.
*F16C 33/62* (2006.01)
*C22C 38/00* (2006.01)
(Continued)

(52) U.S. Cl.
CPC .............. *F16C 33/62* (2013.01); *C21D 9/36* (2013.01); *C21D 9/40* (2013.01); *C22C 38/00* (2013.01);
(Continued)

(58) Field of Classification Search
CPC .. F16C 19/364; F16C 33/543; F16C 33/4623; F16C 33/6651; F16C 33/6674;
(Continued)

(56) References Cited

U.S. PATENT DOCUMENTS 3,228,090 A * 1/1966 Schaeffler ............. F16C 33/545
29/558
4,317,601 A * 3/1982 Faigley, Jr. ........... F16C 19/364
384/576
(Continued)

FOREIGN PATENT DOCUMENTS

| CN | 1902408 A | 1/2007 |
|---|---|---|
| CN | 1934282 A | 3/2007 |

(Continued)

OTHER PUBLICATIONS

International Search Report dated Sep. 2, 2014, received in related International Application No. PCT/JP2014/064977, filed Jun. 5, 2014 (translation is provided).
(Continued)

*Primary Examiner* — Marcus Charles
(74) *Attorney, Agent, or Firm* — McDermott Will & Emery LLP

(57) ABSTRACT

A tapered roller bearing includes an outer ring, an inner ring, a plurality of tapered rollers, and a holder. A nitrogen concentration in a surface layer portion under a contact surface is 0.3 mass % or more. The holder includes a small annular portion, a large annular portion, and a plurality of column portions. A pocket has a trapezoidal shape in which a portion housing a small diameter side of the tapered roller is located on a reduced width side while a portion housing a large diameter side of the tapered roller is located on an increased width side. Each of the column portions on the reduced width side of the pocket is provided with a cutout.

16 Claims, 18 Drawing Sheets

(51) Int. Cl.

| | | |
|---|---|---|
| *C22C 38/34* | (2006.01) | |
| *C22C 38/44* | (2006.01) | |
| *C22C 38/02* | (2006.01) | |
| *C22C 38/04* | (2006.01) | |
| *C22C 38/18* | (2006.01) | |
| *C22C 38/40* | (2006.01) | |
| *C21D 9/36* | (2006.01) | |
| *C21D 9/40* | (2006.01) | |
| *C23C 8/32* | (2006.01) | |
| *F16C 19/36* | (2006.01) | |
| *C22C 38/12* | (2006.01) | |
| *F16C 19/54* | (2006.01) | |

(52) U.S. Cl.
CPC .......... *C22C 38/001* (2013.01); *C22C 38/002* (2013.01); *C22C 38/02* (2013.01); *C22C 38/04* (2013.01); *C22C 38/12* (2013.01); *C22C 38/18* (2013.01); *C22C 38/34* (2013.01); *C22C 38/40* (2013.01); *C22C 38/44* (2013.01); *C23C 8/32* (2013.01); *F16C 19/364* (2013.01); *F16C 19/547* (2013.01); *F16C 2204/64* (2013.01); *F16C 2204/66* (2013.01); *F16C 2204/74* (2013.01)

(58) Field of Classification Search
CPC .............. F16C 2240/40; F16C 2361/61; F16C 33/6681; F16C 33/467; F16C 2240/46; F16C 2204/40; F16C 2204/60; F16C 33/58; C21D 9/40; C22D 38/00; C22D 38/12
USPC ....... 384/450, 470, 571–572, 575, 593, 564, 384/569; 29/898.067, 898.07
See application file for complete search history.

(56) References Cited

U.S. PATENT DOCUMENTS

| | | | | |
|---|---|---|---|---|
| 4,462,643 | A * | 7/1984 | Gilbert ................ | F16C 33/4635 384/548 |
| 4,664,537 | A * | 5/1987 | Ascheron ............. | F16C 19/364 384/470 |
| 5,033,878 | A * | 7/1991 | Tsuji .................... | F16C 23/086 384/576 |
| 6,068,406 | A * | 5/2000 | Yoshida ................ | F16C 19/46 384/470 |
| 6,513,987 | B2 * | 2/2003 | Takahashi ........... | F16C 33/4682 384/574 |
| 7,144,162 | B2 * | 12/2006 | Kumar ................ | F16C 33/6681 384/470 |
| 7,540,665 | B2 * | 6/2009 | Ueno .................... | F16C 33/543 384/571 |
| 7,594,762 | B2 | 9/2009 | Watanabe et al. | |
| 7,918,607 | B2 * | 4/2011 | Beluffi ................ | F16C 19/364 384/470 |
| 2002/0181820 | A1 * | 12/2002 | Suzuki ................ | F16C 19/364 384/571 |
| 2005/0047699 | A1 * | 3/2005 | Tsujimoto ............ | F16C 19/364 384/571 |
| 2007/0014501 | A1 | 1/2007 | Ueno et al. | |
| 2007/0151634 | A1 | 7/2007 | Fujita | |
| 2008/0118196 | A1 | 5/2008 | Watanabe et al. | |
| 2009/0215583 | A1 | 8/2009 | Urakami et al. | |
| 2010/0002975 | A1 | 1/2010 | Ueno | |
| 2010/0239205 | A1 | 9/2010 | Ohki et al. | |
| 2014/0048179 | A1 | 2/2014 | Fujita et al. | |
| 2014/0363115 | A1 | 12/2014 | Yamada et al. | |

FOREIGN PATENT DOCUMENTS

| | | | |
|---|---|---|---|
| CN | 101874125 A | 10/2010 | |
| EP | 1614917 A2 | 1/2006 | |
| EP | 1647727 A2 | 4/2006 | |
| EP | 1770294 A1 | 4/2007 | |
| EP | 2642145 A1 | 9/2013 | |
| JP | H0932858 A | 2/1997 | |
| JP | H11201149 A | 7/1999 | |
| JP | 2004-011712 A | 1/2004 | |
| JP | 2004232858 A | 8/2004 | |
| JP | 2005233236 A | 9/2005 | |
| JP | 2006045591 A | 2/2006 | |
| JP | 2006046391 A | 2/2006 | |
| JP | 2007024168 A | 2/2007 | |
| JP | 2008-51276 A | 3/2008 | |
| JP | 2008-121706 A | 5/2008 | |
| JP | 2008303402 A | 12/2008 | |
| JP | 2009204122 A | 9/2009 | |
| JP | 2009-270173 A | 11/2009 | |
| JP | 2010031307 A | 2/2010 | |
| JP | 2012107676 A | 6/2012 | |
| JP | 2012-201933 A | 10/2012 | |
| JP | 2012-229482 A | 11/2012 | |
| JP | 2012-237062 A | 12/2012 | |
| JP | 2013011010 A | 1/2013 | |
| JP | EP 2642145 A1 * | 9/2013 | .............. C21D 1/06 |

OTHER PUBLICATIONS

Notice on the First Office Action dated Apr. 12, 2017, issued in corresponding Chinese Patent Application No. 201480032977.X, with English language translation.

Supplementary Partial European Search Report dated Feb. 20, 2017, in corresponding European Patent Application No. 14810885.5.

Office Action dated Aug. 8, 2017, issued in Japanese Patent Application No. 2013-121847, with English language translation.

* cited by examiner

TAPERED ROLLER BEARING

CROSS-REFERENCE

This application is the U.S. National Phase under 35 U.S.C. §371 of International Application No. PCT/JP2014/064977, filed Jun. 05, 2014, which claims the benefit of Japanese Application No. 2013-121847, filed Jun. 10, 2013, the entire contents of each are hereby incorporated by reference.

TECHNICAL FIELD

The present invention relates to a tapered roller bearing, and more particularly to a tapered roller bearing that is improved in seizure resistance and increased in life.

BACKGROUND ART

There have been increased demands for fuel saving of automobiles as part of the energy conservation policy in recent years. According to such demands, torque reduction in bearings used in automobiles has been required. Furthermore, as to a bearing supporting a transmission, a differential and the like of the automobile, the space for housing such a bearing has tended to be reduced due to multistage transmissions and increased space for driving operations. Accordingly, the load applied per size of the bearing has been increased. Furthermore, the bearing used in an automobile has also been required to have an increased life under the oil lubrication environment in which foreign substances are mixed. Furthermore, it is desirable to manufacture such a bearing using an inexpensive material in a low cost manner. Thus, it is desirable to manufacture a bearing using a material that can be available in every country in the world by a simple method that does not lead to an increase in cost.

Examples of a bearing that supports a transmission, a differential and the like in an automobile may be a tapered roller bearing. The tapered roller bearing is formed of: an inner ring in which a small collar and a large collar are provided on both sides of a raceway surface formed on an outer circumferential surface; an outer ring in which a raceway surface is formed on an inner circumferential surface; a plurality of tapered rollers arranged between the raceway surfaces of the inner ring and the outer ring; and a holder holding the tapered roller housed in a pocket. Furthermore, the holder is formed of: a small annular portion continuously extending on the side of a small diameter end face of the tapered roller; a large annular portion continuously extending on the side of a large diameter end face of the tapered roller; and a plurality of column portions that couple these annular portions. Furthermore, the pocket is formed in a planar shape having a trapezoidal shape in which a portion housing the small diameter side of the tapered roller is located on a reduced width side while a portion housing the large diameter side is located on an increased width side.

In a transmission, a differential and the like of the automobile, the tapered roller bearing is used in the state where its lower portion is immersed in an oil bath, and therefore, the oil in the oil bath flows into the bearing as a lubricating oil in accordance with rotation of the tapered roller bearing. In such an application, the lubricating oil flows into the bearing from the small diameter side of the tapered roller. Then, the lubricating oil flowing from the outer diameter side relative to the holder flows into the large diameter side of the tapered roller along the raceway surface of the outer ring. Also, the lubricating oil flowing from the inner diameter side relative to the holder flows into the large diameter side of the tapered roller along the raceway surface of the inner ring.

In this way, as a tapered roller bearing used in the situation where lubricating oil flows in from the outside, there is disclosed a tapered roller bearing configured to have a holder having a pocket provided with a cutout, so that the lubricating oil divided and flowing into the outer diameter side and the inner diameter side of the holder is caused to flow through the cutout, thereby improving circulation of the lubricating oil through the bearing (for example, see Japanese Patent Laying-Open No. 09-32858 (PTD 1) and Japanese Patent Laying-Open No. 11-201149 (PTD 2)).

Furthermore, according to the tapered roller bearing into which lubricating oil flows into the bearing while being divided into the outer diameter side and the inner diameter side of the holder, the proportion of the lubricating oil flowing from the inner diameter side of the holder into the inner ring side is increased, which causes a problem that torque loss increases. In other words, the lubricating oil flowing from the outer diameter side of the holder into the outer ring side smoothly passes along the raceway surface of the outer ring toward the large diameter side of the tapered roller and flows out from the inside of the bearing. In contrast, the lubricating oil flowing from the inner diameter side of the holder into the inner ring side is blocked by a large collar formed on the outer circumferential surface of the inner ring and retained within the bearing. Accordingly, when the proportion of the lubricating oil that flows from the inner diameter side of the holder into the inner ring side is increased, the amount of the lubricating oil retained within the bearing increases, which causes a problem that this lubricating oil results in a flow resistance against rotation of the bearing, thereby increasing torque loss. For addressing this problem, there is disclosed a tapered roller bearing configured to have a holder having a trapezoidal-shaped pocket that is provided at its column portion on the reduced width side with a cutout, so that the lubricating oil flowing from the inner diameter side of the holder into the inner ring side is allowed to escape toward the outer ring side, thereby allowing a reduction in the amount of the lubricating oil retained within the bearing (for example, see Japanese Patent Laying-Open No. 2007-24168 (PTD 3)).

CITATION LIST

Patent Document

PTD 1: Japanese Patent Laying-Open No. 09-32858
PTD 2: Japanese Patent Laying-Open No. 11-201149
PTD 3: Japanese Patent Laying-Open No. 2007-24168

SUMMARY OF INVENTION

Technical Problem

According to the tapered roller bearing disclosed in above-described PTD 3, the torque loss caused by the flow resistance of the lubricating oil has been reduced, but the seizure resistance, the life (particularly, a rolling fatigue life under the foreign-matters intrusion environment) and the like of the bearing have not been sufficiently considered. Thus, an object of the present invention is to provide a tapered roller bearing that is improved in seizure resistance and increased in life.

Solution to Problem

A tapered roller bearing according to one aspect of the present invention includes: an outer ring having an outer ring rolling contact surface on an inner circumferential surface; an inner ring having an inner ring rolling contact surface on an outer circumferential surface, having a small collar and a large collar formed on both sides of the inner ring rolling contact surface, and arranged on an inner side of the outer ring; a plurality of tapered rollers arranged between the outer ring rolling contact surface and the inner ring rolling contact surface; and a holder having a pocket housing each of the tapered rollers. At least one of bearing components including the outer ring, the inner ring and the tapered roller is made of steel containing 0.6 mass % or more and 1.50 mass % or less of carbon, 0.15 mass % or more and 2.50 mass % or less of silicon, 0.30 mass % or more and 1.50 mass % or less of manganese, and 0.20 mass % or more and 2.00 mass % or less of chromium, with the rest made up of impurities. In at least one of the bearing components, a nitrogen concentration in a surface layer portion under a contact surface in contact with another component is 0.3 mass % or more. The holder includes a small annular portion continuously extending on a side of a small diameter end face of the tapered roller, a large annular portion continuously extending on a side of a large diameter end face of the tapered roller, and a plurality of column portions coupling the small annular portion and the large annular portion. The pocket has a trapezoidal shape in which a portion housing a small diameter side of the tapered roller is located on a reduced width side while a portion housing a large diameter side of the tapered roller is located on an increased width side. Each of the column portions on the reduced width side of the pocket is provided with a cutout.

A tapered roller bearing according to another aspect of the present invention includes: an outer ring having an outer ring rolling contact surface on an inner circumferential surface; an inner ring having an inner ring rolling contact surface on an outer circumferential surface, having a small collar and a large collar formed on both sides of the inner ring rolling contact surface, and arranged on an inner side of the outer ring; a plurality of tapered rollers arranged between the outer ring rolling contact surface and the inner ring rolling contact surface; and a holder having a pocket housing each of the tapered rollers. At least one of bearing components including the outer ring, the inner ring and the tapered roller is made of steel containing 0.6 mass % or more and 1.50 mass % or less of carbon, 0.15 mass % or more and 2.50 mass % or less of silicon, 0.30 mass % or more and 1.50 mass % or less of manganese, and 0.20 mass % or more and 2.00 mass % or less of chromium, and further containing at least one of 0.5 mass % or less of nickel and 0.2 mass % or less of molybdenum, with the rest made up of impurities. In at least one of the bearing components, a nitrogen concentration in a surface layer portion under a contact surface in contact with another component is 0.3 mass % or more. The holder includes a small annular portion continuously extending on a side of a small diameter end face of the tapered roller, a large annular portion continuously extending on a side of a large diameter end face of the tapered roller, and a plurality of column portions coupling the small annular portion and the large annular portion. The pocket has a trapezoidal shape in which a portion housing a small diameter side of the tapered roller is located on a reduced width side while a portion housing a large diameter side of the tapered roller is located on an increased width side. Each of the column portions on the reduced width side of the pocket is provided with a cutout.

The present inventor has conducted earnest studies about the approach for improving the seizure resistance and increasing the life for a tapered roller bearing made of a material equivalent to SUJ2 defined by the JIS standards that can be readily available in every country in the world (SUJ2 defined by the JIS standards, 52100 defined by the AST standards, 100Cr6 defined by the DIN standards, GCr5 or GCr15 defined by the GB standards, and IIIX15 defined by the ГOCT standards). As a result, the inventor has obtained the following findings to conceive of the present invention.

In the case where the lubricating oil retained within the bearing is reduced, the torque loss caused by the flow resistance of the lubricating oil is reduced, thereby suppressing a temperature rise due to an increase in torque. However, the lubrication between the bearing components (an inner ring, an outer ring, a tapered roller, and the like) deteriorates, so that seizure is more likely to occur on the contact surface between the components. In other words, the temperature is more likely to rise locally in this contact surface, with the result that the hardness of the contact surface may decrease. Furthermore, damage such as cracking is more likely to occur in the surface layer portion under the contact surface of each bearing component (an inner ring, an outer ring, a tapered roller, and the like). Accordingly, this contact surface is subjected to a carbonitriding process, so that the durability can be improved. According to the studies by the present inventor, when the nitrogen concentration in the surface layer portion is set at 0.3 mass % or more, the durability of the contact surface is improved.

In the tapered roller bearing according to one and another aspects of the present invention, at least one of bearing components including the outer ring, the inner ring and the tapered roller is made of steel having the above-mentioned component composition, and therefore, can be made using a material equivalent to SUJ2 readily available in every country in the world. Furthermore, each column portion on the reduced width side of the pocket in the holder is provided with a cutout. Accordingly, the lubricating oil retained within the bearing is further reduced, with the result that the torque loss caused by the flow resistance of the lubricating oil can be reduced. Furthermore, the nitrogen concentration in the surface layer portion under the contact surface of at least one of bearing components including the outer ring, the inner ring and the tapered roller is 0.3 mass % or more. Thereby, the temper softening resistance of the contact surface is improved, so that occurrence of seizure on the contact surface can be suppressed. Furthermore, since the nitrogen concentration in the surface layer portion is 0.3 mass % or more, the durability of the contact surface is improved, with the result that the life of the bearing can be increased. Therefore, the tapered roller bearing according to one and another aspects of the present invention can provide a tapered roller bearing that is reduced in torque loss, improved in seizure resistance and increased in life. In addition, the "surface layer portion" means a region extending from the contact surface to a depth of 20 μm.

In the above-described tapered roller bearing, the large collar of the inner ring may include a large collar surface that is in sliding contact with the large diameter end face of the tapered roller. Furthermore, the nitrogen concentration in each of the surface layer portion under the large diameter end face of the tapered roller and the surface layer portion under the large collar surface of the inner ring may be 0.3 mass % or more.

Since the large diameter end face of the tapered roller and the large collar surface of the inner ring are in sliding contact with each other, the temperature is particularly more likely to rise, so that seizure readily occurs. Accordingly, the nitrogen concentration in each of the surface layer portion under the large diameter end face and the surface layer portion under the large collar surface is set at 0.3 mass % or more, with the result that the seizure resistance can be further more improved.

In the above-described tapered roller bearing, at least one of the bearing components including the outer ring, the inner ring and the tapered roller may have an entire average retained austenite amount of 20 vol % or less.

According to the studies by the present inventor, in the case where the entire average retained austenite amount in the bearing component is 20 vol % or less, the rate of secular dimensional change lowers. Therefore, the entire average retained austenite amount in the bearing component is set at 20 vol % or less, so that the dimensional stability of the bearing can be improved.

According to the above-described tapered roller bearing, in at least one of the bearing components including the outer ring, the inner ring and the tapered roller, the surface layer portion under the contact surface includes five or more carbonitrides each having a diameter of 0.5 μm or less that are present per 100 μm$^2$ in a cross section perpendicular to the contact surface.

Five or more microscopic carbonitrides each having a diameter of 0.5 μm or less are present per 100 μm$^2$ in the surface layer portion, thereby strengthening the surface layer portion, so that the durability of the surface layer portion is further improved. Consequently, a bearing with excellent durability can be achieved. In this case, a carbonitride is a product in which a part of carbide of iron or a part of carbon of the carbide is replaced with nitrogen, and includes a Fe—C-based compound and a Fe—C—N-based compound. Furthermore, this carbonitride may contain an alloy element such as chromium contained in steel.

According to the above-described tapered roller bearing, in at least one of the bearing components including the outer ring, the inner ring and the tapered roller, a retained austenite amount in a region extending from the contact surface to a depth of 50 μm may be 20 vol % or more. Thereby, the durability of the contact surface, particularly the durability of the contact surface in a foreign-matters intrusion environment, can be further more improved.

In the above-described tapered roller bearing, a nitrogen concentration in an inner diameter surface of the inner ring may be 0.05 mass % or less. The dimensional change caused by decomposition of retained austenite may often occur as expansion of the component dimensions. On the other hand, the inner ring of the tapered roller bearing is often used in the state where its inner diameter surface is fitted on the outer circumferential surface of a shaft or the like. Accordingly, when the inner diameter expands, the state where the inner ring is fitted on the shaft may be rendered unstable. In contrast, the nitrogen concentration in the inner diameter surface is decreased to 0.05 mass % or less, so that occurrence of the above-described problems can be suppressed.

A tapered roller bearing according to still another aspect of the present invention includes: an outer ring having an outer ring rolling contact surface on an inner circumferential surface; an inner ring having an inner ring rolling contact surface on an outer circumferential surface, having a small collar and a large collar formed on both sides of the inner ring rolling contact surface, and arranged on an inner side of the outer ring; a plurality of tapered rollers arranged between the outer ring rolling contact surface and the inner ring rolling contact surface; and a holder having a pocket housing each of the tapered rollers. At least the tapered roller among the outer ring, the inner ring and the tapered roller is made of quench-hardened steel containing 0.90 mass % or more and 1.05 mass % or less of carbon, 0.15 mass % or more and 0.35 mass % or less of silicon, 0.01 mass % or more and 0.50 mass % or less of manganese, and 1.30 mass % or more and 1.65 mass % or less of chromium, with the rest made up of impurities. A nitrogen concentration in a contact surface that is in contact with another component is 0.25 mass % or more, and a retained austenite amount in the contact surface is 6 vol % or more and 12 vol % or less.

In the tapered roller bearing according to still another aspect of the present invention, at least the tapered roller among the outer ring, the inner ring and the tapered roller is made of steel having the above-described component composition, and therefore, can be made using a material equivalent to SUJ2 readily available in every country in the world. Furthermore, the nitrogen concentration in the contact surface of at least the tapered roller among the outer ring, the inner ring and the tapered roller is 0.25 mass % or more. Thereby, the temper softening resistance of the contact surface is improved, so that occurrence of seizure on the contact surface can be suppressed. Furthermore, since the nitrogen concentration in the contact surface is 0.25 mass % or more, the durability of the contact surface is improved, with the result that the life of the bearing can be increased. Therefore, the tapered roller bearing according to still another aspect of the present invention can provide a tapered roller bearing that is improved in seizure resistance and increased in life.

Furthermore, according to further studies by the present inventor, in the case where the nitrogen concentration in the contact surface is increased to 0.25 mass % while the retained austenite amount is not particularly adjusted, the retained austenite amount in the contact surface is about 20 vol % to 40 vol % in terms of the relation with the nitrogen amount. In this way, in the state where an excessive amount of austenite (exceeding 12 vol %) is retained, the indentation resistance of the contact surface decreases. On the other hand, in the state where an excessively small amount of austenite (less than 6 vol %) is retained, the life in the foreign-matters intrusion environment is shortened.

Furthermore, unlike a steel ball used for a ball bearing, the tapered roller is not sufficiently provided with indentation resistance in the manufacturing process. Also, unlike a steel ball, the rolling position of the tapered roller is fixed, and therefore, it is highly required to lengthen the life of the tapered roller. Therefore, in order to allow the tapered roller bearing to achieve both of the indentation resistance and the rolling fatigue life at relatively high levels, it is necessary to take measures to improve the indentation resistance and to increase the rolling fatigue life particularly for a tapered roller.

In the tapered roller bearing according to still another aspect of the present invention, the retained austenite amount in the contact surface of at least the tapered roller among the outer ring, the inner ring and the tapered roller is 6 vol % or more and 12 vol % or less. Accordingly, a life reduction is suppressed and the indentation resistance in the contact surface is improved. Furthermore, in the present tapered roller bearing, the nitrogen concentration in the contact surface of at least the tapered roller is 0.25% or more and the retained austenite amount is 6 vol % or more and 12 vol % or less. Therefore, the tapered roller bearing according to still another aspect of the present invention can provide a tapered roller bearing for which both of the indentation resistance and the rolling fatigue life are achieved at relatively high levels.

In the above-described tapered roller bearing, the retained austenite amount in the contact surface of at least the tapered roller among the outer ring, the inner ring and the tapered roller may be 10 vol % or less. Thereby, the indentation resistance can be further more improved.

In the above-described tapered roller bearing, the nitrogen concentration in the contact surface of at least the tapered roller among the outer ring, the inner ring and the tapered roller may be 0.5 mass % or less, or may be 0.4 mass % or less. Thereby, nitrogen can be introduced into steel while suppressing an increase in cost, and also the retained austenite amount can be readily adjusted.

In the above-described tapered roller bearing, the holder may include a small annular portion continuously extending on a side of a small diameter end face of the tapered roller, a large annular portion continuously extending on a side of a large diameter end face of the tapered roller, and a plurality of column portions coupling the small annular portion and the large annular portion. Furthermore, the pocket may have a trapezoidal shape in which a portion housing a small diameter side of the tapered roller is located on a reduced width side while a portion housing a large diameter side of the tapered roller is located on an increased width side. Furthermore, each of the column portions on the reduced width side of the pocket may be provided with a cutout. Thereby, the lubricating oil retained within the bearing is further reduced, with the result that the torque loss caused by the flow resistance of the lubricating oil can be reduced.

In the above-described tapered roller bearing, the contact surface of at least the tapered roller among the outer ring, the inner ring and the tapered roller may have a hardness of 60.0 HRC or more. Thereby, the rolling fatigue life can be further increased and the indentation resistance can be further improved.

In the above-described tapered roller bearing, the contact surface of at least the tapered roller among the outer ring, the inner ring and the tapered roller may have a hardness of 64.0 HRC or less. In the case where the nitrogen concentration is raised to 0.25 mass % or higher to bring about a state where the hardness of the contact surface exceeds 64.0 HRC, it becomes difficult to adjust the retained austenite at 12 vol % or less. Accordingly, by setting the hardness of the contact surface at 64.0 HRC or less, the retained austenite amount can be readily adjusted to fall within a range of 12 vol % or less.

The above-described tapered roller bearing may serve to support a rotation member, which rotates within a differential or a transmission, so as to be rotatable relative to another member arranged adjacent to this rotation member.

The tapered roller bearing according to the above-described present invention that is improved in seizure resistance and increased in life is suitable as a bearing used for a differential or a transmission.

In the above-described tapered roller bearing, a small annular portion on the reduced width side of the pocket in the holder may be provided with a cutout. Thereby, the lubricating oil flowing from the inner diameter side of the holder into the inner ring side is allowed to escape, so that the amount of lubricating oil that reaches the large collar of the inner ring can be further reduced. Consequently, the torque loss caused by the flow resistance of the lubricating oil can be further reduced.

In the above-described tapered roller bearing, each column portion on the increased width side of the pocket in the holder may be provided with a cutout. Thereby, the tapered roller can be brought into sliding contact with the column portion in a well balanced manner.

In the above-described tapered roller bearing, a total area of the cutout provided in each column portion on the reduced width side of the pocket in the holder may be greater than a total area of the cutout provided in each column portion on the increased width side of the pocket.

Thereby, the amount of the lubricating oil that reaches the large collar of the inner ring can be further reduced. Consequently, the torque loss caused by the flow resistance of the lubricating oil can be further reduced.

In the above-described tapered roller bearing, the small annular portion of the holder may be provided with a collar facing the small collar of the inner ring. Furthermore, a gap between the collar of the small annular portion and the small collar of the inner ring may be 2.0% or less of an outer diameter of the small collar of the inner ring. Thereby, the amount of the lubricating oil flowing from the inner diameter side of the holder into the inner ring side can be reduced. Consequently, the torque loss caused by the flow resistance of the lubricating oil can be still further reduced.

In the above-described tapered roller bearing, the tapered roller may have a surface provided with a recess formed in a concave shape. Furthermore, the surface of the tapered roller may have a surface roughness (Ryni) of 0.4 μm or more and 1.0 μm or less, and an Sk value of −1.6 or less. Thereby, the lubricating oil can be retained over the entire surface of the tapered roller. As a result, even in the case where the amount of the lubricating oil retained within the bearing is reduced, the contact between the tapered roller and each of the outer ring and the inner ring can still be sufficiently lubricated.

The above-described parameter Ryni is an average value of the maximum height per reference length, that is, a value obtained by extracting only the reference length from the roughness curve in its average line direction and measuring the distance between the peak line and the bottom line of the extracted portion in the longitudinal magnification direction of the roughness curve (ISO 4287:1997). Furthermore, the Sk value shows a strain of the roughness curve, that is, a value showing the asymmetry of the concavo-convex distribution of roughness (ISO 4287:1997). In the symmetrical distribution like a Gaussian distribution, the Sk value is close to 0. In the case where convexities are deleted from convexities and concavities, the Sk value shows a negative value. In the case where concavities are deleted, the Sk value shows a positive value. The Sk value can be controlled by selecting the rotation speed of a barrel finishing machine, the machining time, the workpiece input amount, the type and size of the polishing chip, and the like. By setting the Sk value at −1.6 or lower, the lubricating oil can be retained uniformly in numberless microscopic concave-shaped recesses.

Advantageous Effects of Invention

As apparent from the above description, the tapered roller bearing according to the present invention can provide a tapered roller bearing that is improved in seizure resistance and increased in life.

DESCRIPTION OF EMBODIMENTS

Figure 1:
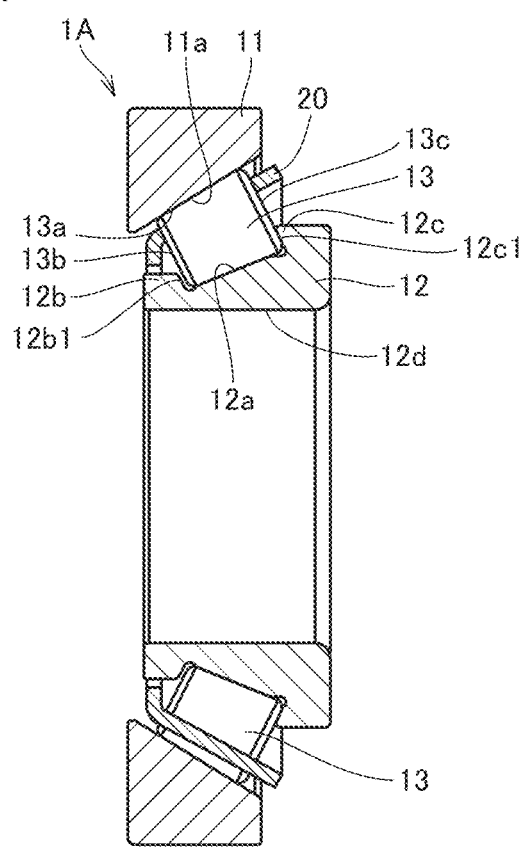
FIG. 1 is a schematic cross-sectional view showing the structure of a tapered roller bearing according to the first embodiment.

The embodiments of the present invention will be hereinafter described with reference to the accompanying drawings, in which the same or corresponding components are denoted by the same reference characters, and a description thereof will not be repeated.

(First Embodiment)

The first embodiment that is one embodiment of the present invention will be first hereinafter described. Referring to FIG. 1, a tapered roller bearing 1A according to the present embodiment includes an annular outer ring 11, an annular inner ring 12, a plurality of tapered rollers 13, and a holder 20. Outer ring 11 has an outer ring rolling contact surface 11a on the inner circumferential surface. Inner ring 12 has an inner ring rolling contact surface 12a on the outer circumferential surface, and is disposed on the inner side of outer ring 11 in the radial direction such that inner ring rolling contact surface 12a faces outer ring rolling contact surface 11a. Tapered roller 13 includes a rolling surface 13a, a small diameter end face 13b, and a large diameter end face 13c. Tapered roller 13 is arranged between outer ring rolling contact surface 11a and inner ring rolling contact surface 12a while being held by holder 20. A small collar 12b and a large collar 12c are formed on both sides of inner ring rolling contact surface 12a, thereby restricting the movement of tapered roller 13 in the axial direction. Small collar 12b and large collar 12c include a small collar surface 12b1 and a large collar surface 12c1, respectively. Rolling surface 13a of tapered roller 13 is in rolling contact with outer ring rolling contact surface 11a and inner ring rolling contact surface 12a. Also, large diameter end face 13c is in sliding contact with large collar surface 12c1.

Outer ring 11, inner ring 12 and tapered roller 13 each are made of quench-hardened steel containing 0.60 mass % or more and 1.50 mass % or less of carbon, 0.15 mass % or more and 2.50 mass % or less of silicon, 0.30 mass % or more and 1.50 mass % or less of manganese, and 0.20 mass % or more and 2.00 mass % or less of chromium, with the rest made up of impurities (for example, SUJ2 that is a high-carbon chromium bearing steel defined by the JIS standards). In each of the above-described bearing components (outer ring 11, inner ring 12 and tapered roller 13), the nitrogen concentration in the surface layer portion under the contact surface in contact with another component is 0.3 mass % or more. In other words, in outer ring 11, the nitrogen concentration in the surface layer portion under the outer ring rolling contact surface 11a serving as a contact surface is 0.3 mass % or more. In inner ring 12, the nitrogen concentration in the surface layer portion under inner ring rolling contact surface 12a and large collar surface 12c1 each serving as a contact surface is 0.3 mass % or more. In tapered roller 13, the nitrogen concentration in the surface layer portion under rolling surface 13a and large diameter end face 13c each serving as a contact surface is 0.3 mass % or more.

Figure 2:
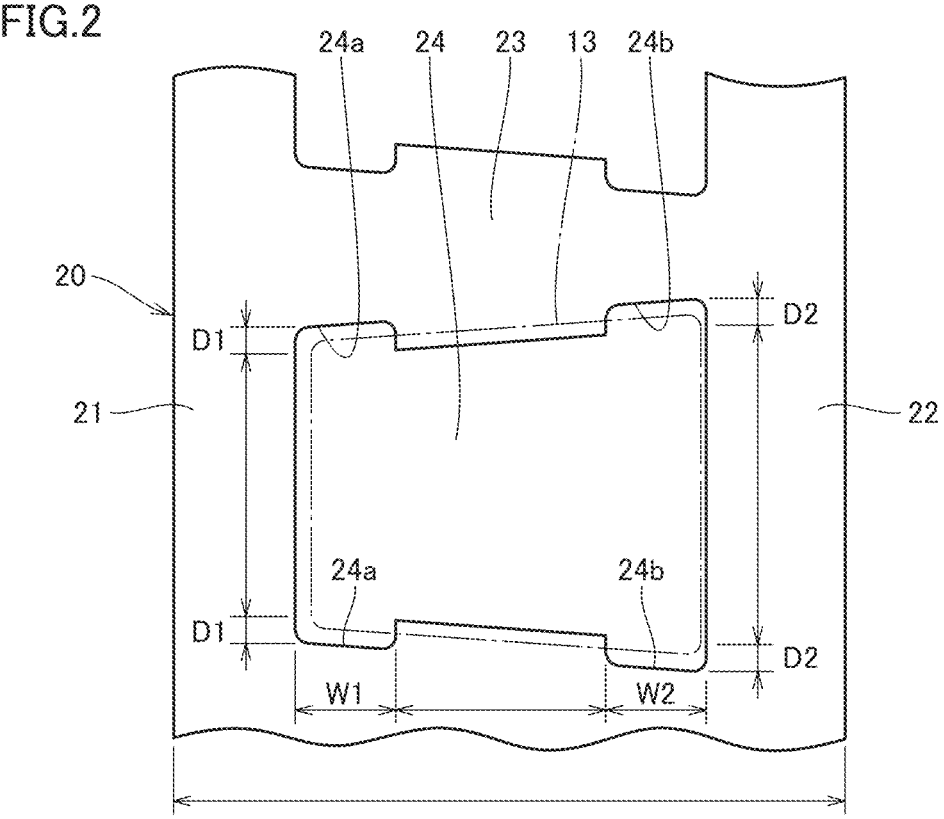
FIG. 2 is a schematic plan view showing the structure of a holder.

Referring to FIG. 2, holder 20 includes a small annular portion 21 continuously extending on the side of the small diameter end face of tapered roller 13, a large annular portion 22 continuously extending on the side of the large diameter end face of tapered roller 13, and a plurality of column portions 23 coupling small annular portion 21 and large annular portion 22. Holder 20 has a pocket 24 for housing tapered roller 13. Pocket 24 has a trapezoidal shape in which a portion housing a small diameter side of tapered roller 13 is located on the reduced width side while a portion housing a large diameter side of tapered roller 13 is located on the increased width side. Pocket 24 has column portions 23 on the reduced width side and the increased width side that are provided with two cutouts 24a and two cutouts 24b, respectively. Cutouts 24a and 24b have depths D1 and D2, for example, of 1 mm and also have widths W1 and W2, for example, of 4.6 mm.

As described above, in tapered roller bearing 1A according to the present embodiment, outer ring 11, inner ring 12 and tapered roller 13 each are made of steel having the above-described component composition, and therefore, can be made using a material such as SUJ2 defined by the JIS standards that can be readily available in every country in the world. Furthermore, column portion 23 on the reduced width side of pocket 24 in holder 20 is provided with cutout 24a. Accordingly, the lubricating oil retained within the bearing is further reduced, with the result that torque loss is reduced. More specifically, referring to FIG. 3, when tapered roller bearing 1A rotates at a high speed and its lower portion is immersed in an oil bath, the lubricating oil in the oil bath flows from the small diameter side of tapered roller 13 into the bearing while being separated into the outer diameter side and the inner diameter side of holder 20, as shown by arrows in FIG. 3. The lubricating oil flowing from the outer diameter side of holder 20 into outer ring 11 flows out toward the large diameter side of tapered roller 13 along outer ring rolling contact surface 11a of outer ring 11. On the other hand, part of the lubricating oil flowing from the inner diameter side of holder 20 into inner ring 12 passes through cutout 24a and flows out toward the outer diameter side of holder 20. Thereby, the amount of the lubricating oil that reaches large collar 12c of inner ring 12 is reduced, so that the amount of the lubricating oil retained within the bearing is reduced. Consequently, the torque loss caused by the flow resistance of the lubricating oil is reduced. Furthermore, in tapered roller bearing 1A, the nitrogen concentration in the surface layer portion under the contact surface of each of outer ring 11, inner ring 12 and tapered roller 13 (outer ring rolling contact surface 11a, inner ring rolling contact surface 12a, large collar surface 12c1, rolling surface 13a, and large diameter end face 13c) is 0.3 mass % or more, so that the temper softening resistance of each contact surface is improved. Accordingly, even in the case where the lubricating ability of the bearing is poor because the amount of the lubricating oil retained within the bearing is relatively small, seizure on the contact surface can be suppressed. Furthermore, since the nitrogen concentration in the surface layer portion is 0.3 mass % or more, the durability of the contact surface is improved, with the result that the foreign-matters intrusion lubrication life is increased. In this way, tapered roller bearing 1A according to the present embodiment is reduced in torque loss, improved in seizure resistance and increased in life.

In the above-described tapered roller bearing 1A, large collar 12c of inner ring 12 may include large collar surface 12c1 that is in sliding contact with large diameter end face 13c of tapered roller 13. Furthermore, the nitrogen concentration in each of the surface layer portion under large diameter end face 13c of tapered roller 13 and the surface layer portion under large collar surface 12c1 of inner ring 12 may be 0.3 mass % or more. Since large diameter end face 13c of tapered roller 13 and large collar surface 12c1 of inner ring 12 are in sliding contact with each other, the temperature is more likely to rise and seizure is more likely to occur. Accordingly, as the nitrogen concentration in each of the surface layer portion under large diameter end face 13c and the surface layer portion under large collar surface 12c1 is set at 0.3 mass % or more, the seizure resistance can be further improved.

In the above-described tapered roller bearing 1A, steel forming outer ring 11, inner ring 12 and tapered roller 13 may further contain at least one of: 0.5 mass % or less of nickel; and 0.2 mass % or less of molybdenum. Thereby, steel is improved in quenchability, so that the bearing component can be increased in size.

In the above-described tapered roller bearing 1A, outer ring 11, inner ring 12 and tapered roller 13 each may have an entire average retained austenite amount of 20 vol % or less. Thereby, the dimensional stability of the above-described bearing component can be improved.

In the above-described tapered roller bearing 1A, the surface layer portion under the contact surface of each of outer ring 11, inner ring 12 and tapered roller 13 (outer ring rolling contact surface 11a, inner ring rolling contact surface 12a, large collar surface 12c1, rolling surface 13a, and large diameter end face 13c) may include five or more carbonitrides each having a diameter of 0.5 µm or less that are present per 100 µm$^2$ in a cross section perpendicular to this contact surface. In this way, as a large number of microscopic carbonitrides are present in the surface layer portion, the durability of the surface layer portion is further improved. It is preferable that ten or more carbonitrides are present in the above-described region. It should be noted that the existing amount (number) of carbonitrides can be confirmed for example through observation of the above-mentioned regions with a scanning electron microscope (SEM) and an image analysis of the result of the observation.

In the above-described tapered roller bearing 1A, the retained austenite amount in the region extending from the contact surfaces of outer ring 11, inner ring 12 and tapered roller 13 (outer ring rolling contact surface 11a, inner ring rolling contact surface 12a, large collar surface 12c1, rolling surface 13a, and large diameter end face 13c) to a depth of 50 µm may be 20 vol % or more. Thereby, the durability of the contact surface, particularly the durability in the foreign-matters intrusion environment, can be improved.

In the above-described tapered roller bearing 1A, the nitrogen concentration in inner diameter surface 12d of inner ring 12 is 0.05 mass % or less. This allows stabilization of the state where inner ring 12 is fitted on a member such as a shaft.

Figure 4:
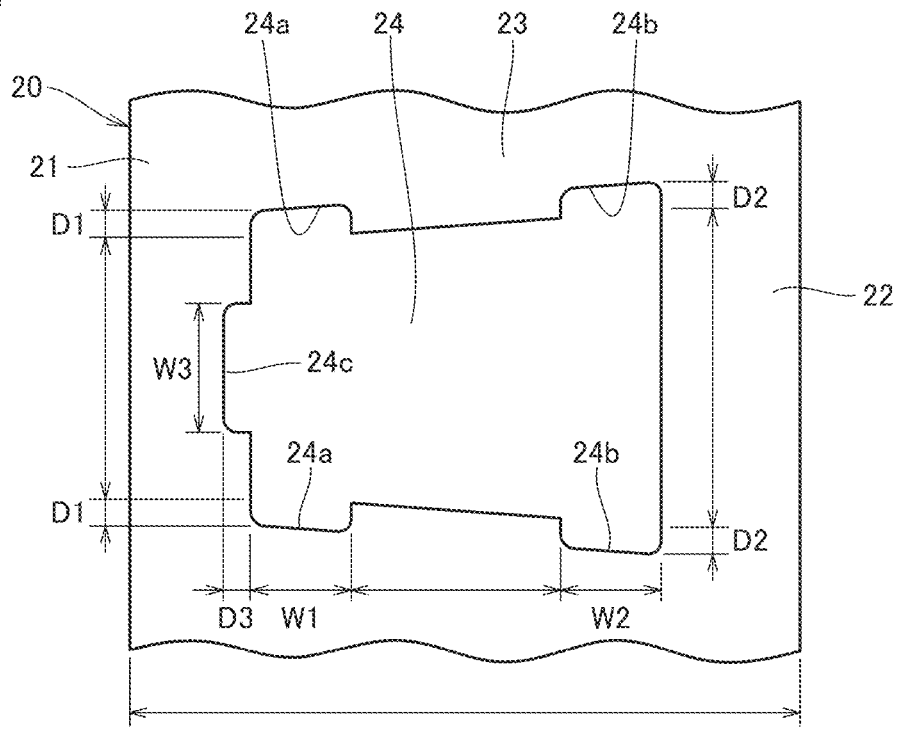
FIG. 4 is a schematic plan view showing the structure of a holder of a modification.
Figure 5:
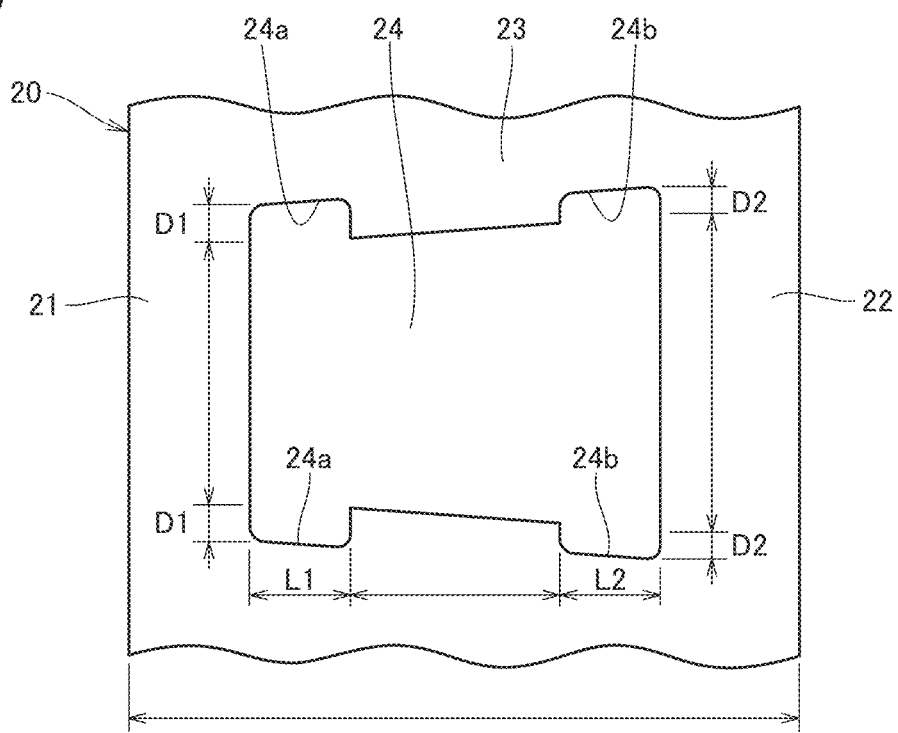
FIG. 5 is a schematic plan view showing the structure of the holder of the modification.

Referring to FIGS. 4 and 5, a modification of holder 20 will be hereinafter described. Referring to FIG. 4, small annular portion 21 on the reduced width side of pocket 24 may be provided with a cutout 24c. Furthermore, the total area of three cutouts 24a and 24c on the reduced width side may be larger than the total area of two cutouts 24b on the increased width side. Thereby, the lubricating oil flowing from the inner diameter side of holder 20 into the inner ring 12 side is allowed to escape from cutout 24c, so that the amount of the lubricating oil that reaches large collar 12c of inner ring 12 can be further reduced. Consequently, the torque loss caused by the flow resistance of the lubricating oil can be reduced. In addition, cutout 24c has a depth D3 for example of 1 mm and a width W3 for example of 5.7 mm.

Referring to FIG. 5, depth D1 of each cutout 24a provided in column portion 23 on the reduced width side may be greater than depth D2 of each cutout 24b provided in column portion 23 on the increased width side. Also, the total area of each cutout 24a may be greater than the total area of each cutout 24b. Thereby, the amount of the lubricating oil that reaches large collar 12c of inner ring 12 can be further reduced, with the result that the torque loss caused by the flow resistance of the lubricating oil can be further reduced.

Figure 3:
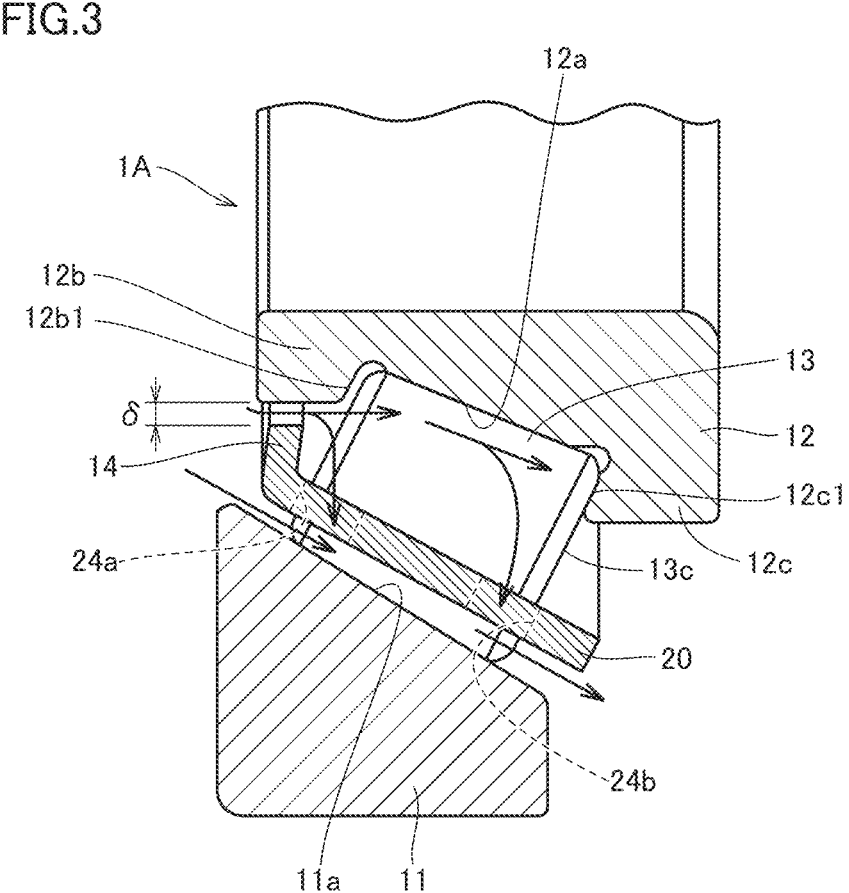
FIG. 3 is a schematic cross-sectional view showing, in an enlarged manner, the structure of the tapered roller bearing according to the first embodiment.

Referring to FIG. 3, a collar 14 facing inward in the radial direction so as to face the outer diameter surface of small collar 12b of inner ring 12 may be provided on the axially outside of the small annular portion of holder 20. Furthermore, a gap δ between the inner diameter surface of collar 14 and the outer diameter surface of small collar 12b of inner ring 12 may be set at 2.0% or less of the outer diameter dimension of small collar 12b. Thereby, the amount of the lubricating oil flowing from the inner diameter side of holder 20 into the inner ring 12 side can be significantly reduced as compared with the lubricating oil flowing from the outer diameter side of holder 20 into the outer ring 11 side. Consequently, the torque loss caused by the flow resistance of the lubricating oil can be still further reduced.

The entire surface of tapered roller 13 may be provided with innumerable microscopic concave-shaped recesses (not shown) at random. Also, in the surface of tapered roller 13 provided with such recesses, the surface roughness parameter (Ryni) may be 0.4 μm or more and 1.0 μm or less, and the Sk value may be −1.6 or less. Thereby, the lubricating oil can be retained over the entire surface of tapered roller 13. Consequently, even in the case where the amount of the lubricating oil retained within the bearing is reduced, sufficient lubrication can be provided in contact between tapered roller 13 and each of outer ring 11 and inner ring 12.

Then, the method of manufacturing a tapered roller bearing according to the present embodiment will be hereinafter described. By the method of manufacturing a tapered roller bearing according to the present embodiment, the above-described tapered roller bearing 1A is manufactured.

Figure 6:
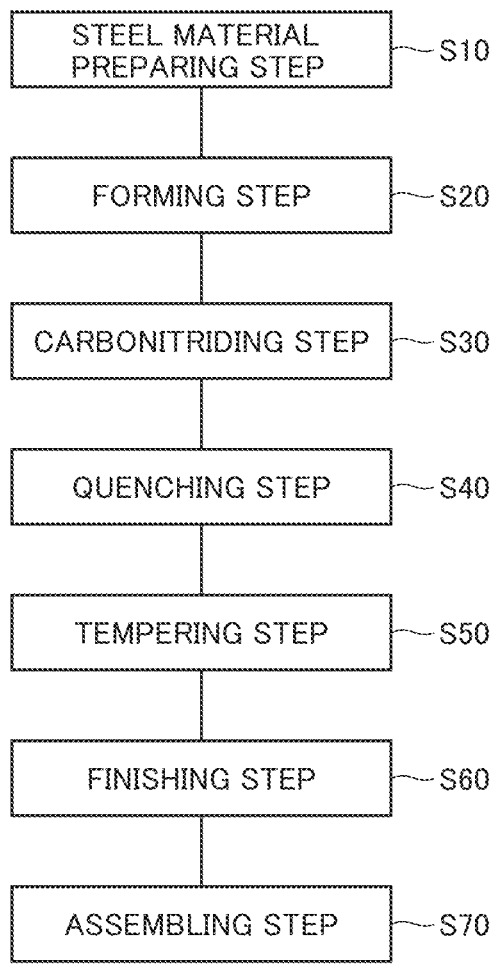
FIG. 6 is a flowchart schematically illustrating a method of manufacturing the tapered roller bearing according to the first embodiment.

Referring to FIG. 6, a steel material preparing step is first performed as a step (S10). In this step (S10), a steel material is prepared, which is made of: steel containing 0.60 mass % or more and 1.50 mass % or less of carbon, 0.15 mass % or more and 2.50 mass % or less of silicon, 0.30 mass % or more and 1.50 mass % or less of manganese, and 0.20 mass % or more and 2.00 mass % or less of chromium, with the rest made up of impurities; or steel containing 0.60 mass % or more and 1.50 mass % or less of carbon, 0.15 mass % or more and 2.50 mass % or less of silicon, 0.30 mass % or more and 1.50 mass % or less of manganese, and 0.20 mass % or more and 2.00 mass % or less of chromium, and further containing at least one of 0.5 mass % or less of nickel and 0.2 mass % or less of molybdenum, with the rest made up of impurities, for example, high-carbon chromium bearing steel such as SUJ2, SUJ3, SUJ4, and SUJ5 defined by the JIS standards. Specifically, a steel bar, a steel wire and the like for example having the above-described component composition are prepared.

Then, a forming step is performed as a step (S20). In this step (S20), for example, the steel bar, the steel wire and the like prepared in the above-described step (S10) are subjected to a process such as forging and turning and the like. Thereby, a formed body formed in a shape of outer ring 11, inner ring 12, tapered roller 13, or the like (see FIG. 1) is produced.

Next, a carbonitriding step is performed as a step (S30). In this step (S30), the formed body prepared in the step (S20) is subjected to a carbonitriding process. This carbonitriding process is performed for example in the following way. First, the formed body is preheated in a temperature range of approximately 780° C. or more and 820° C. or less for a period of 30 minutes or more and 90 minutes or less. Next, in an atmosphere in which an endothermic gas such as RX gas has carbon potentials adjusted by addition of propane gas or butane gas which serves as an enrich gas and ammonia gas is further introduced to the endothermic gas, the preheated formed body is heated for being carbonitrided. The temperature for the carbonitriding process can for example be 820° C. or more and 880° C. or less. The time for the carbonitriding process can be set in accordance with the nitrogen concentration of a nitrogen-rich layer that is to be formed into a formed member, and can for example be 4 hours or more and 7 hours or less. Accordingly, the nitrogen-rich layer can be formed while suppressing decarbonization of the formed member.

Next, a quenching step is performed as a step (S40). In this step (S40), the formed member in which the nitrogen-rich layer is formed by the carbonitriding process in the step (S30) is rapidly cooled from a predetermined quenching temperature and thus undergoes a quenching process. The quenching temperature can for example be 820° C. or more and 880° C. or less, and is preferably 850° C. or more and 880° C. or less. The quenching process can be performed for example by immersing the formed member in a quenching oil serving as a coolant held at a predetermined temperature. Moreover, in this step (S40), preferably the region to serve as a surface layer portion under the contact surface of the formed member is cooled at an average cooling rate of 20° C./sec or more in a temperature range from the quenching temperature to 600° C. and an average cooling rate of 30° C./sec or more in a temperature range from the quenching temperature to 400° C. Accordingly, the region to become a surface layer portion where the quenchability is deteriorated due to the carbonitriding process in the step (S30) can reliably be quench-hardened.

Next, a tempering step is performed as a step (S50). In this step (S50), the formed member subjected to the quenching process in the step (S40) is subjected to a tempering process. Specifically, in an atmosphere heated to a temperature range for example of 180° C. or more and 240° C. or less, the formed member is held for a period of 0.5 hours or more and 3 hours or less, and thus the tempering process is performed. Furthermore, the tempering temperature may be 180° C. or more and 210° C. or less.

Next, a finishing step is performed as a step (S60). In this step (S60), the formed member subjected to the tempering process in the step (S50) is processed to thereby form a contact surface that is to be in contact with another part (outer ring rolling contact surface 11a, inner ring rolling contact surface 12a, large collar surface 12c1, rolling surface 13a, and large diameter end face 13c). As finishing, grinding for example may be performed. Through the above-described steps, outer ring, 11, inner ring 12, tapered roller 13 and the like are completed.

Further, an assembling step is performed as a step (S70). In this step (S70), outer ring 11, inner ring 12 and tapered roller 13 prepared in the steps (S10) to (S60) and holder 20 (see FIG. 2) prepared separately are combined and assembled into the above-described tapered roller bearing 1A. Thus, the method of manufacturing a tapered roller bearing in the present embodiment comes to an end.

In the above-described step (S30), the formed member is subjected to the carbonitriding process such that the nitrogen concentration in the surface layer portion under the contact surface is 0.3 mass % or more by the finishing process in the subsequent step (S60). Namely, in consideration of a process allowance or the like in the step (S60), the nitrogen amount is adjusted such that the nitrogen concentration in the surface layer portion after completion of the contact surface can be set at 0.3 mass % or more.

Furthermore, in the above-described step (S50), the formed member is subjected to a tempering process such that the average retained austenite amount in the entire formed member is 20 vol % or less.

Furthermore, in order to achieve a finished product including 20 vol % or more of the retained austenite amount in the region extending from the contact surface (outer ring rolling contact surface 11a, inner ring rolling contact surface 12a, large collar surface 12c1, rolling surface 13a, and large diameter end face 13c) to a depth of 50 μm, for example, the nitrogen concentration distribution produced in the step (S30), the quenching temperature in the step (S40), the tempering temperature in the step (S50), the process allowance in the step (S60), and the like can be adjusted.

Furthermore, in order to set the nitrogen concentration in inner diameter surface 12d of inner ring 12 at 0.05 mass % or less, for example, inner diameter surface 12d only has to be covered by a jig or a coating layer to perform the step (S30).

Furthermore, in order to bring about the state where the surface layer portion includes five or more carbonitrides each having a diameter of 0.5 μm or less that are present per 100 μm² in a cross section perpendicular to the contact surface, for example, the quenching temperature in the step (S40), the tempering temperature in the step (S50) and the like can be adjusted.

(Second Embodiment)

Then, the second embodiment that is another embodiment of the present invention will be hereinafter described. The tapered roller bearing according to the present embodiment basically has the same configuration and effect as those in the above-described first embodiment. However, the tapered roller bearing according to the present embodiment is different from the above-described first embodiment in configurations of the outer ring, the inner ring and the tapered roller.

Figure 7:
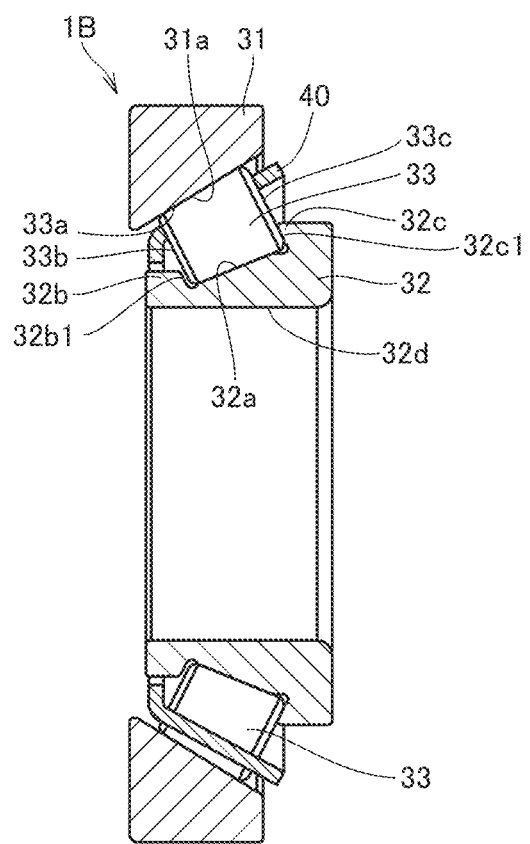
FIG. 7 is a schematic cross-sectional view showing the structure of a tapered roller bearing according to the second embodiment.

Referring to FIG. 7, a tapered roller bearing 1B according to the present embodiment includes outer ring 31, inner ring 32, tapered roller 33, and holder 40, similarly to the above-described first embodiment. At least tapered roller 33 among outer ring 31, inner ring 32 and tapered roller 33, more specifically, outer ring 31, inner ring 32 and tapered roller 33, is made of quench-hardened steel containing 0.90 mass % or more and 1.05 mass % or less of carbon, 0.15 mass % or more and 0.35 mass % or less of silicon, 0.01 mass % or more and 0.50 mass % or less of manganese, and 1.30 mass % or more and 1.65 mass % or less of chromium, with the rest made up of impurities. In each of the above-described bearing components (outer ring 31, inner ring 32 and tapered roller 33), the nitrogen concentration in the contact surface in contact with another component is 0.25 mass % or more, and the retained austenite amount in the contact surface is 6 vol % or more and 12 vol % or less. Specifically, in outer ring 31, the nitrogen concentration in outer ring rolling contact surface 31a serving as a contact surface is 0.25 mass % or more, and the retained austenite amount is 6 vol % or more and 12 vol % or less. In inner ring 32, the nitrogen concentration in each of inner ring rolling contact surface 32a and large collar surface 32c1 serving as contact surfaces is 0.25 mass % or more, and the retained austenite amount is 6 vol % or more and 12 vol % or less. In tapered roller 33, the nitrogen concentration in each of rolling surface 33a and large diameter end face 33c serving as contact surfaces is 0.25 mass % or more, and the retained austenite amount is 6 vol % or more and 12 vol % or less.

As described above, in tapered roller bearing 1B according to the present embodiment, outer ring 31, inner ring 32 and tapered roller 33 each are made of steel having the above-described component composition, and therefore, can be made using a material equivalent to SUJ2 that can be readily available in every country in the world. Furthermore, since holder 40 has the same structure as that of holder 20 in the above-described first embodiment, torque loss can be decreased by reducing the amount of lubricating oil retained within the bearing, as in the case of the above-described first embodiment. Furthermore, the nitrogen concentration in the contact surface of each of outer ring 31, inner ring 32 and tapered roller 33 (outer ring rolling contact surface 31a, inner ring rolling contact surface 32a, large collar surface 32c1, rolling surface 33a, and large diameter end face 33c) is 0.25 mass % or more. Accordingly, similarly to the case of the above-described first embodiment, occurrence of seizure on the contact surface can be suppressed while the durability of the contact surface can be improved. In this way, tapered roller bearing 1B according to the present embodiment is reduced in torque loss, improved in seizure resistance and increased in life, similarly to the above-described tapered roller bearing 1A.

Furthermore, in tapered roller bearing 1B according to the present embodiment, the retained austenite amount in the contact surface of each of outer ring 31, inner ring 32 and tapered roller 33 (outer ring rolling contact surface 31a, inner ring rolling contact surface 32a, large collar surface 32c1, rolling surface 33a, and large diameter end face 33c) is 6 vol % or more and 12 vol % or less. Accordingly, a decrease in life is suppressed, and the indentation resistance of each contact surface is improved. Furthermore, in tapered roller bearing 1B, the nitrogen concentration in the contact surface of at least tapered roller 33 (rolling surface 33a and large diameter end face 33c) is 0.25 mass % or more, and the retained austenite amount is 6 vol % or more and 12 vol % or less. Accordingly, in tapered roller bearing 1B according to the present embodiment, the indentation resistance and the rolling fatigue life both can be achieved at relatively higher levels.

In the above-described tapered roller bearing 1B, the hardness of the contact surface of each of outer ring 31, inner ring 32 and tapered roller 33 (outer ring rolling contact surface 31a, inner ring rolling contact surface 32a, large collar surface 32c1, rolling surface 33a, and large diameter end face 33c) is preferably 60.0 HRC or more. Thereby, the life is further increased and the indentation resistance is further improved. Furthermore, the hardness of this contact surface is preferably 64.0 HRC or less. Thereby, the retained austenite amount in each contact surface can be readily adjusted at 12 vol % or less.

Then, the method of manufacturing a tapered roller bearing according to the present embodiment will be hereinafter described. In the method of manufacturing a tapered roller bearing according to the present embodiment, the above-described tapered roller bearing 1B is manufactured.

Figure 8:
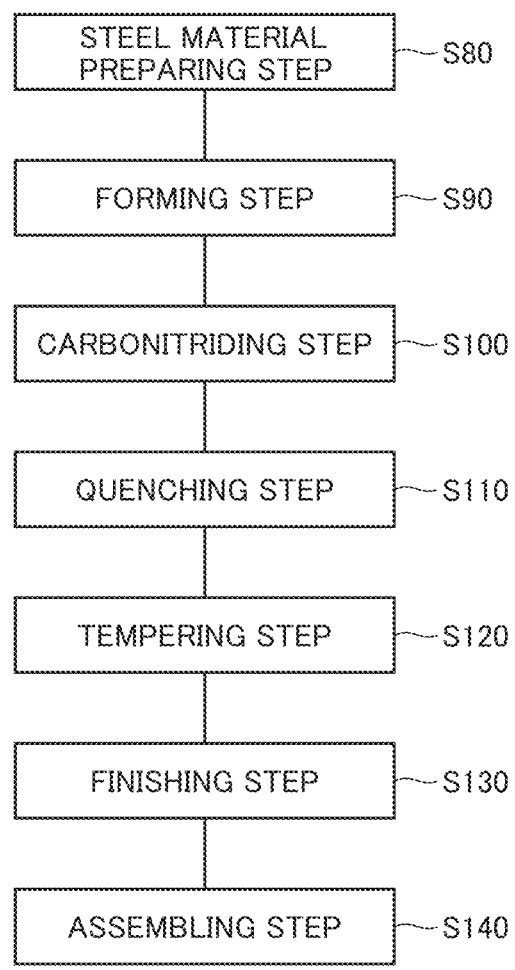
FIG. 8 is a flowchart schematically illustrating a method of manufacturing the tapered roller bearing according to the second embodiment.

Referring to FIG. 8, a steel material preparing step is first performed as a step (S80). In this step (S80), a steel material is prepared, which is made of steel equivalent to SUJ2 defined by the JIS standards, such as SUJ2 defined by the JIS standards, 52100 defined by the ASTM standards, 100Cr6 defined by the DIN standards, GCr5 or GCr15 defined by the GB standards, and ШХ15 defined by the ГОСТ standards. Specifically, for example, a steel bar, a steel wire and the like each having the above-described component composition are prepared.

Then, a forming step is performed as a step (S90). In this step (S90), similarly to the above-described step (S20), formed members that are formed in shapes of outer ring 31, inner ring 32 and tapered roller 33 (see FIG. 7) and the like are fabricated.

Then, a carbonitriding step is performed as a step (S100). In this step (S100), the formed member fabricated in the step (S90) is subjected to a carbonitriding process. This carbonitriding process is for example performed as described below. First, the above-described formed member is preheated for 30 minutes or more and 90 minutes or less in a temperature range from about 780° C. or more and about 820° C. or less. Next, in an atmosphere in which an endothermic gas such as RX gas has carbon potentials adjusted by addition of propane gas or butane gas which serves as an enrich gas and ammonia gas is further introduced to the endothermic gas, the preheated formed member is heated for being carbonitrided. The temperature for the carbonitriding process can for example be 820° C. or more and 880° C. or less. The time for the carbonitriding process can be set in accordance with the nitrogen concentration of a nitrogen-rich layer that is to be formed into a formed member, and can for example be 3 hours or more and 9 hours or less. Accordingly, the nitrogen-rich layer can be formed while suppressing decarbonization of the formed member.

Next, a quenching step is performed as a step (S110). In this step (S110), the formed member in which the nitrogen-rich layer is formed by the carbonitriding process in the step (S100) is rapidly cooled from a predetermined quenching temperature and thus undergoes a quenching process. This quenching temperature is set at 860° C. or less, so that the amount of solid-dissolved carbon and the amount of precipitated carbon in the subsequent tempering step can be readily balanced, and the retained austenite amount can be readily adjusted. Furthermore, the quenching temperature is set at 820° C. or more, so that the amount of solid-dissolved carbon and the amount of precipitated carbon in the subsequent tempering step can be readily balanced, and the retained austenite amount can be readily adjusted. The quenching process can be performed, for example, by immersing the formed member in the quenching oil as a coolant maintained at a prescribed temperature.

Next, a tempering step is performed as a step (S120). In this step (S120), the formed member subjected to the quenching process in the step (S110) is subjected to a tempering process. Specifically, in an atmosphere heated to a temperature range for example of 210° C. or more and 300° C. or less, the formed member is held for a period of 0.5 hours or more and 3 hours or less, and thus the tempering process is performed.

Next, a finishing step is performed as a step (S130). In this step (S130), the formed member subjected to the tempering process in the step (S120) is processed to thereby form a contact surface that is to be in contact with another part (outer ring rolling contact surface 31a, inner ring rolling contact surface 32a, large collar surface 32c1, rolling surface 33a, and large diameter end face 33c). As finishing, grinding for example may be performed. Through the above-described steps, outer ring 31, inner ring 32, tapered roller 33 and the like are completed.

Further, an assembling step is performed as a step (S140). In this step (S140), outer ring 31, inner ring 32 and tapered roller 33 prepared in the steps (S80) to (S130) and holder 20 prepared separately are combined and assembled into tapered roller bearing 1B according to the above-described present embodiment. Thus, the method of manufacturing a tapered roller bearing in the present embodiment comes to an end.

In the above-described step (S100), the formed member is subjected to the carbonitriding process such that the nitrogen concentration in the contact surface (outer ring rolling contact surface 31a, inner ring rolling contact surface 32a, large collar surface 32c1, rolling surface 33a, and large diameter end face 33c) is 0.25 mass % or more by the finishing process in the subsequent step (S130). Namely, in consideration of a process allowance or the like in the step (S130), a nitrogen-rich layer is formed such that the nitrogen concentration in the surface after completion of the contact surface can be set at 0.25 mass % or more.

In the above-described step (S120), the formed member is subjected to the tempering process such that the retained austenite amount in the contact surface (outer ring rolling contact surface 31a, inner ring rolling contact surface 32a, large collar surface 32c1, rolling surface 33a, and large diameter end face 33c) is 6 vol % or more and 12 vol % or less by the finishing process in the subsequent step (S130). Namely, in consideration of a process allowance or the like in the step (S130), the retained austenite amount is adjusted by the tempering process such that the retained austenite amount in the surface after completion of the contact surface can be set at 6 vol % or more and 12 vol % or less.

Furthermore, in the step (S120), it is preferable that the formed member is subjected to a tempering process in a temperature range of 240° C. or more and 300° C. or less. Thereby, carbon that is solid-dissolved in a base material by the quenching process is precipitated as carbide in an appropriate proportion. As a result, solid dissolution strengthening and precipitation strengthening are appropriately balanced, so that outer ring 31, inner ring 32 and tapered roller 33 are improved in indentation resistance.

(Third Embodiment)

Figure 9:
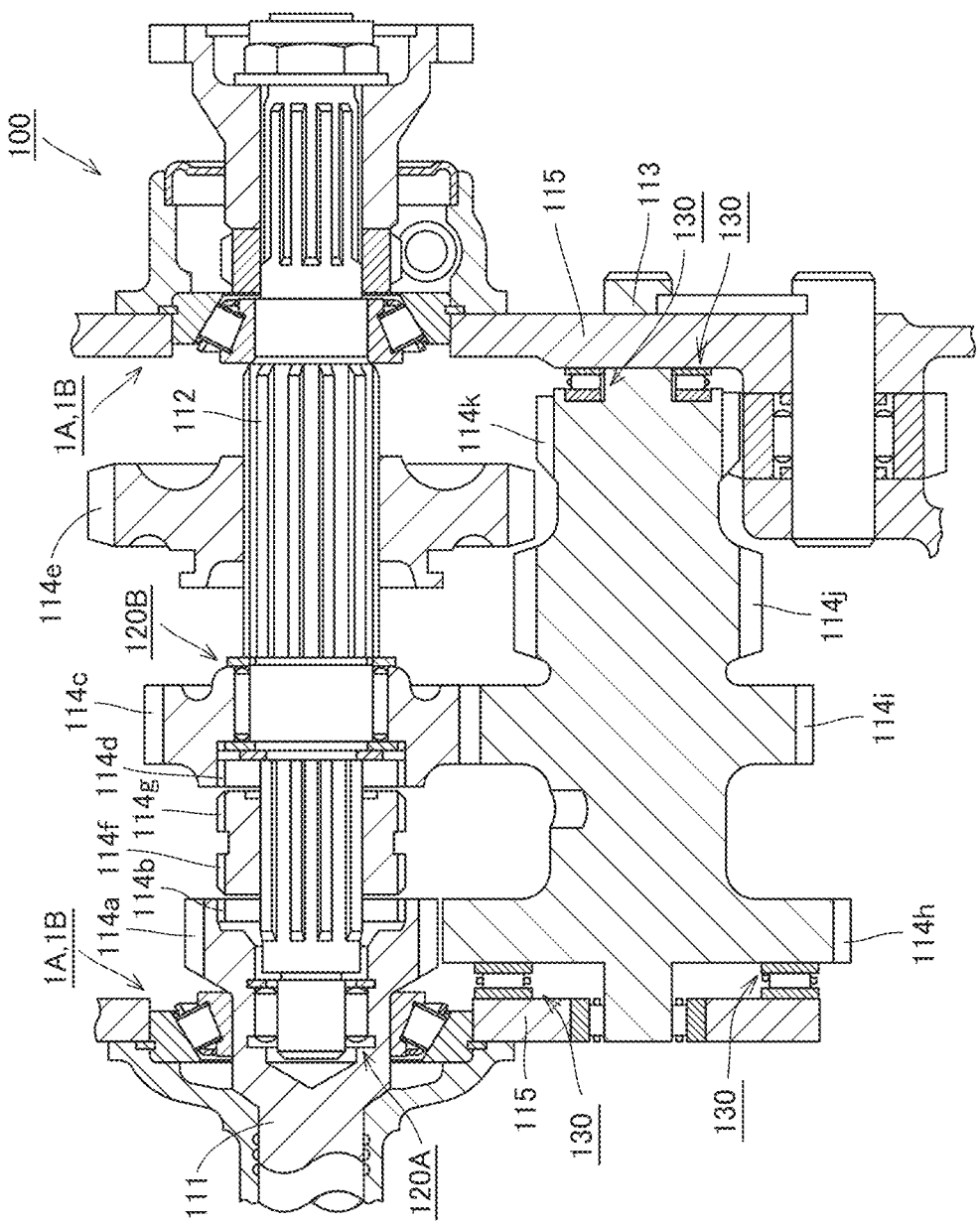
FIG. 9 is a schematic cross-sectional view showing the configuration of a manual transmission according to the third embodiment.

Then, application examples of tapered roller bearings 1A and 1B according to the above-described first and second embodiments will be hereinafter described. Referring to FIG. 9, a manual transmission 100, which is a manual transmission of a constant mesh gear transmission type, includes an input shaft 111, an output shaft 112, a counter shaft 113, gears 114a to 114k, and a housing 115.

Input shaft 111 is supported by tapered roller bearings 1A and 1B so as to be rotatable relative to housing 115. Gear 114a is formed on the outer circumference of input shaft 111 while gear 114b is formed on the inner circumference.

On the other hand, output shaft 112 is supported on one side (on the right side in the figure) by tapered roller bearings 1A and 1B so as to be rotatable relative to housing 115 and supported on the other side (on the left side in the figure) by rolling bearing 120A so as to be rotatable relative to input shaft 111. Gears 114c to 114g are attached to this output shaft 112.

Gear 114c and gear 114d are formed on the outer circumference and the inner circumference, respectively, of the same member. The member having gear 114c and gear 114d formed therein is supported by rolling bearing 120B so as to be rotatable relative to output shaft 112. Gear 114e is attached to output shaft 112 so as to rotate integrally with output shaft 112 and so as to be slidable in the axial direction of output shaft 112.

Furthermore, gear 114f and gear 114g each are formed on the outer circumference of the same member. The member having gear 114f and gear 114g formed therein is attached to output shaft 112 so as to rotate integrally with output shaft 112 and so as to be slidable in the axial direction of output shaft 112. In the case where the member having gear 114f and gear 114g formed therein slides to the left in the figure, gear 114f and gear 114b can engage with each other. In the case where the member having gear 114f and gear 114g formed therein slides to the right in the figure, gear 114g and gear 114d can engage with each other.

Gears 114h to 114k are formed in counter shaft 113. Two thrust needle roller bearings are arranged between counter shaft 113 and housing 115, so that the load (thrust load) of counter shaft 113 in the axial direction is supported. Gear 114h continuously engages with gear 114a, and gear 114i continuously engages with gear 114c. Furthermore, in the case where gear 114e slides to the left in the figure, gear 114j can engage with gear 114e. In the case where gear 114e slides to the right in the figure, gear 114k can engage with gear 114e.

Then, the gear shift operation of manual transmission 100 will be hereinafter described. In manual transmission 100, rotation of input shaft 111 is transmitted to counter shaft 113 by engagement between gear 114a formed in input shaft 111 and gear 114h formed in counter shaft 113. Then, rotation of counter shaft 113 is transmitted to output shaft 112 by engagement between gears 114i to 114k formed in counter shaft 113 and gears 114c, 114e attached to output shaft 112, and the like. Thereby, rotation of input shaft 111 is transmitted to output shaft 112.

When rotation of input shaft 111 is transmitted to output shaft 112, the rotation speed of output shaft 112 can be changed in a stepwise manner with respect to the rotation speed of input shaft 111 by changing the gears engaging between input shaft 111 and counter shaft 113, and the gears engaging between counter shaft 113 and output shaft 112. Furthermore, rotation of input shaft 111 can also be directly transmitted to output shaft 112 by causing gear 114b of input shaft 111 and gear 114f of output shaft 112 to engage directly with each other without having counter shaft 113 interposed therebetween.

In the following, the gear shift operation of manual transmission 100 will be more specifically described. In the case where gear 114f does not engage with gear 114b, gear 114g does not engage with gear 114d, and gear 114e engages with gear 114j, the driving force of input shaft 111 is transmitted to output shaft 112 through gears 114a, 114h, 114j, and 114e. This is defined as the first speed, for example.

In the case where gear 114g engages with gear 114d and gear 114e does not engage with gear 114j, the driving force of input shaft 111 is transmitted to output shaft 112 through gears 114a, 114h, 114i, 114c, 114d, and 114g. This is defined as the second speed, for example.

In the case where gear 114f engages with gear 114b and gear 114e does not engage with gear 114j, input shaft 111 is directly coupled to output shaft 112 by engagement between gear 114b and gear 114f, and the driving force of input shaft 111 is transmitted directly to output shaft 112. This is defined as the third speed, for example.

As described above, manual transmission 100 includes tapered roller bearings 1A and 1B in order to support input shaft 111 and output shaft 112 serving as rotation members so as to be rotatable relative to housing 115 disposed adjacent thereto. In this way, tapered roller bearings 1A and 1B according to the above-described first and second embodiments can be used within manual transmission 100. Also, tapered roller bearings 1A and 1B that are reduced in torque loss, improved in seizure resistance and increased in life are suitable to be used within manual transmission 100 for which high contact pressure is applied between the rolling element and the race member.

(Fourth Embodiment)

Figure 10:
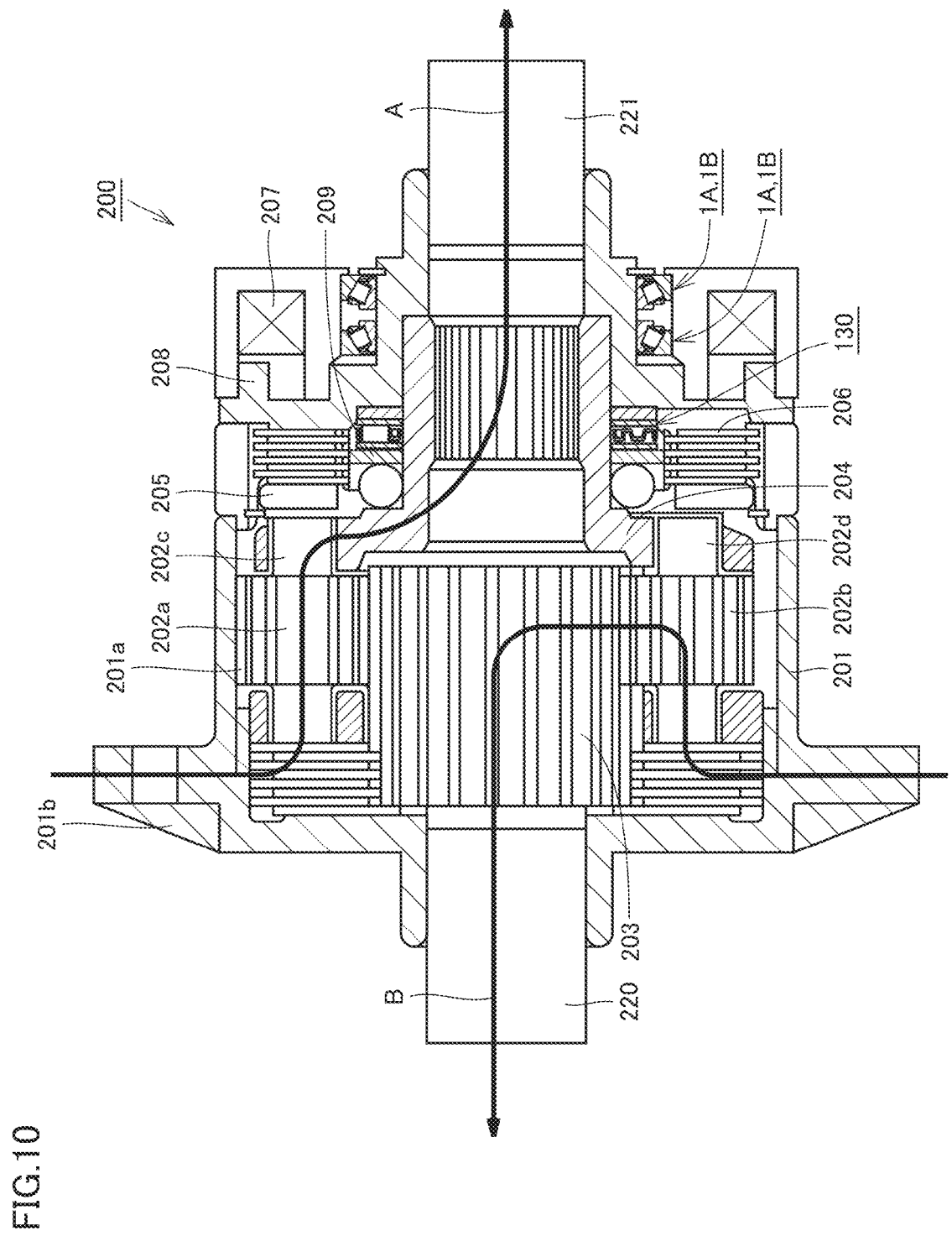
FIG. 10 is a schematic cross-sectional view showing the configuration of a differential according to the fourth embodiment.
Figure 11:
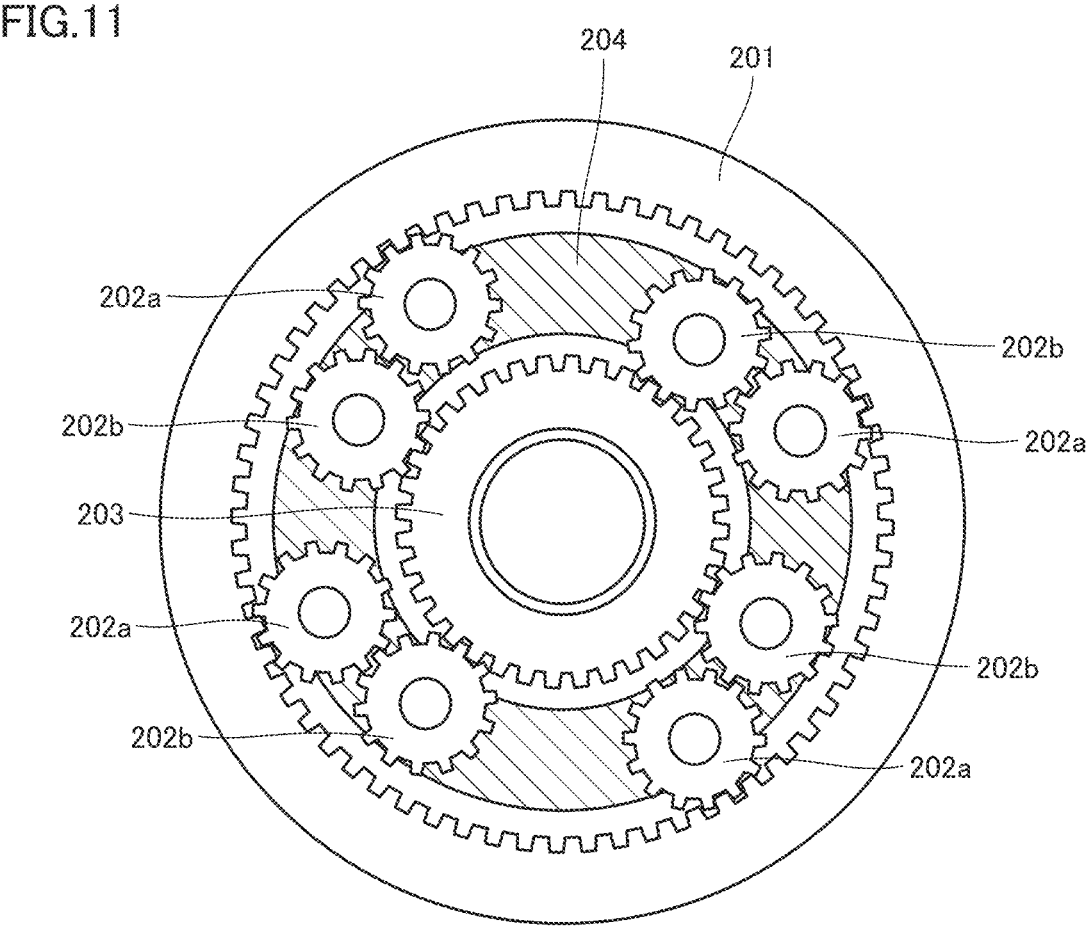
FIG. 11 is a schematic diagram showing arrangement of pinion gears in FIG. 10.

Then, other application examples of tapered roller bearings 1A and 1B according to the above-described first and second embodiments will be hereinafter described. Referring to FIGS. 10 and 11, a differential 200 includes a differential case 201, pinion gears 202a and 202b, a sun gear 203, a pinion carrier 204, an armature 205, a pilot clutch 206, an electromagnet 207, a rotor clutch (differential case) 208, and a cam 209.

An internal tooth 201a provided in the inner circumference of differential case 201 and each of four pinion gears 202a engages with each other; four pinion gears 202a and four pinion gears 202b respectively engage with each other; and each of four pinion gears 202b and sun gear 203 engages with each other. Sun gear 203 is connected to the end of a left drive shaft 220 as the first drive shaft, so that sun gear 203 and left drive shaft 220 can integrally rotate on their axes. Furthermore, each of rotation shafts 202c of pinion gears 202a and each of rotation shafts 202d of pinion gears 202b are held by pinion carrier 204 so as to be rotatable on their own axes. Pinion carrier 204 is connected to the end of right drive shaft 221 as the second drive shaft, so that pinion carrier 204 and right drive shaft 221 can integrally rotate on their own axes.

Furthermore, electromagnet 207, pilot clutch 206, rotor clutch (differential case) 208, armature 205, and cam 209 constitute an electromagnetic clutch.

An external tooth 201b of differential case 201 engages with the gear of a ring gear that is not shown, and differential case 201 rotates on its own axis with the motive power received from the ring gear. In the case where there is no differential motion between left drive shaft 220 and right drive shaft 221, pinion gears 202a and 202b do not rotate on their own axes, but three members including differential case 201, pinion carrier 204 and sun gear 203 integrally rotate. Specifically, motive power is transmitted from the ring gear to left drive shaft 220 as shown by an arrow B while motive power is transmitted from the ring gear to right drive shaft 221 as shown by an arrow A.

In the case where resistance is applied to one of left drive shaft 220 and right drive shaft 221, for example, to left drive shaft 220, resistance is applied to sun gear 203 connected to left drive shaft 220, and thus, pinion gears 202a and 202b each rotate on their axes. Then, rotation of pinion carrier 204 on its axis is accelerated by rotation of pinion gears 202a and 202b, and then, a differential motion is generated between left drive shaft 220 and right drive shaft 221.

Furthermore, when a certain level or more differential motion occurs between left drive shaft 220 and right drive shaft 221, the electromagnetic clutch is energized, and a magnetic field is generated by electromagnet 207. Pilot clutch 206 and armature 205 are attracted to electromagnet 207 by means of the magnetic induction effect to generate a friction torque. This friction torque is converted by cam 209 in the thrust direction. Then, a main clutch is pressed by the friction torque converted in the thrust direction against differential case 208 through pinion carrier 204, thereby generating a differential motion limiting torque. Thrust needle roller bearing 130 receives a reaction force in the thrust direction generated by cam 209 and transmits this reaction force to differential case 208. As a result, the twofold-increased thrust force that is proportional to the friction torque is generated by cam 209. In this way, electromagnet 207 can control only pilot clutch 206 to amplify the torque by the booster mechanism, and also can arbitrarily control the friction torque.

In this case, thrust needle roller bearing 130 is arranged between cam 209 and differential case 208. Furthermore, tapered roller bearings 1A and 1B according to the first and second embodiments are arranged between differential case 208 and the member arranged on the outer circumferential side of differential case 208. In this way, tapered roller bearings 1A and 1B according to the above-described first and second embodiments can be used within differential 200. Then, tapered roller bearings 1A and 1B that are reduced in torque loss, improved in seizure resistance and increased in life are suitable to be used within differential 200 for which a high contact pressure is applied between the rolling element and the race member.

EXAMPLES

Example 1

Experiments were conducted for specifically examining the rolling fatigue life, the torque and the seizure resistance of the tapered roller bearing.

(Rolling Fatigue Life Test)

The test was performed on a component of model number 30206 defined by the JIS standards (inner diameter: 30 mm, outer diameter: 62 mm, width: 17.25 mm). First, through a similar procedure to those in the above-described first and second embodiments, an inner ring, an outer ring and a tapered roller were produced (made of SUJ2, quenching temperature: 850° C., tempering temperature: 240° C., nitrogen concentration in the surface layer portion: 0.4 mass %). Then, the produced inner ring was combined with the holder according to the above-described present embodiment to produce a tapered roller bearing (Example). Furthermore, for the purpose of comparison, a tapered roller bearing including a holder according to the above-described present embodiment was also produced without subjecting the inner ring, the outer ring and the tapered roller to a carbonitriding process (Comparative Example 1, made of SUJ2, quenching temperature: 850° C., tempering temperature: 180° C., nitrogen concentration in the surface layer portion: 0 mass %). Furthermore, the inner ring, the outer ring and the tapered roller were subjected to a carbonitriding process similarly to the above-described Example to thereby also produce a tapered roller not including a holder according to the above-described present embodiment but including a conventional holder (Comparative Example 2). In the test, a load was applied to set the P/C (load/load capacity) at 0.4 and the contact pressure on the inner ring raceway surface was set at 2.5 GPa. ATF having a kinematic viscosity of 30 mm$^2$/s (40° C.) was used as lubricating oil. Hard foreign substances (800 HV) each having a particle size of 100 μm to 180 μm was mixed into the lubricating oil (1.0 g/L).

(Torque Measurement Test)

The test was performed on a component of model number 30208 defined by the JIS standards (inner diameter: 40 mm, outer diameter: 80 mm, width: 19.75 mm). Tapered roller bearings of Example and Comparative Example were produced similarly to the above-described case. The test load (Fa) was set at 800 kgf. The rotation speed was set at 3500 min$^{-1}$. Differential oil having a kinematic viscosity of 150 mm$^2$/s (40° C.) was used as lubricating oil (natural circulation). The measurement temperature was set at 100° C.

(Seizure Resistance Test)

The test was performed on a component of model number 30206 defined by the JIS standards (inner diameter: 30 mm, outer diameter: 62 mm, width: 17.25 mm). Tapered roller bearings of Example and Comparative Example were produced similarly to the above-described case. The test load (Fa) was set at 2 kN to 15 kN. The rotation speed was set at 3500 min$^{-1}$ or 6500 min$^{-1}$. ATF having a kinematic viscosity of 30 mm$^2$/s (40° C.) was used as lubricating oil. The amount of oil supply was set at 45 ml/min. Time taken to raise the temperature by 150° C. was measured. The results of the above-describe test are shown in Table 1.

TABLE 1

|  | Life Test (Time Ratio) | Torque Test (Torque Value Ratio) | Seizure Resistance Test (Time Ratio) |
|---|---|---|---|
| Example | 2.8 | 0.95 | 1.35 |
| Comparative Example 1 | 1 | 1 | 1 |
| Comparative Example 2 | 2.5 | 1.32 | 1.2 |

(Results of Rolling Fatigue Life Test)

When comparing the results between Example and Comparative Example 1, the life was significantly increased in Example as compared with Comparative Example 1. This result showed that it is effective for the life under the condition of foreign-matters intrusion lubrication that the nitrogen concentration in the surface layer portion of each of the inner ring, the outer ring and the tapered roller is set at 0.4 mass % (0.3 mass % or more). Furthermore, when comparing the results between Example and Comparative Example 2, the life was increased in Example as compared with Comparative Example 2. This is because the holder according to the above-described embodiment is used, thereby limiting the amount of lubricating oil retained within the bearing, so that the amount of foreign substances contained in this lubricating oil is also reduced. This result showed that it is effective for the life under the condition of foreign-matters intrusion lubrication to employ the holder according to the above-described embodiment.

(Torque Measurement Test Results)

When comparing the results between Example and Comparative Example 2, the torque value was smaller in Example than in Comparative Example 2. This result showed that it is effective for reducing the torque in the tapered roller bearing to employ the holder according to the above-described present embodiment. Furthermore, when comparing the results between Example and Comparative Example 1, the torque value was further reduced in Example. This is because the nitrogen concentration in the surface layer portion of each of the inner ring, the outer ring and the tapered roller is increased, thereby improving the temper softening resistance, so that the deformation amount in the rolling contact portion and the sliding contact portion between the race (an inner ring and an outer ring) and the tapered roller is reduced, with the result that the areas of these contact portions are further more reduced. This result showed that it is effective for reducing the torque in the tapered roller bearing to raise the nitrogen concentration in the surface layer portion of each of the race and the tapered roller.

(Seizure Resistance Test)

When comparing the results between Example and Comparative Example 1, the seizure resistance was improved more in Example than in Comparative Example 1. This is because the temper softening resistance is improved by increasing the nitrogen concentration in the surface layer portion of each of the race and the tapered roller. This result showed that it is effective for improving the seizure resistance in the tapered roller bearing to enhance the nitrogen concentration in the surface layer portion of each of the race and the tapered roller. Furthermore, when comparing the results between Example and Comparative Example 2, the seizure resistance was improved more in Example than in Comparative Example 2. This is because the holder according to the above-described embodiment is used to cause a reduction in torque of the bearing, thereby slowing down the temperature rise in the bearing.

Example 2

The experiment was conducted for specifically examining the seizure resistance of the tapered roller bearing. First, in the atmosphere in which ammonia was added to RX gas at 850° C., the inner ring, the outer ring and the tapered roller were subjected to a carbonitriding process (for 180 minutes). Thereby, the surface layer portion under the large collar surface of the inner ring and the surface layer portion under the large diameter end face of the tapered roller were nitrided. Then, these bearing components and the holder according to the above-described embodiment were combined to produce a tapered roller bearing (Example). Furthermore, as Comparative Example, an inner ring, an outer ring and a tapered roller were also produced by immersion quenching by heating for 80 minutes in an RX gas atmosphere at 850° C., and also, a tapered roller bearing was similarly produced (Comparative Example). Then, the tapered roller bearings of Example and Comparative Example were examined with regard to the relation between the atmospheric temperature and the hardness of the large collar surface of the inner ring. The results of the above-described experiments are shown in FIG. 12.

Figure 12:
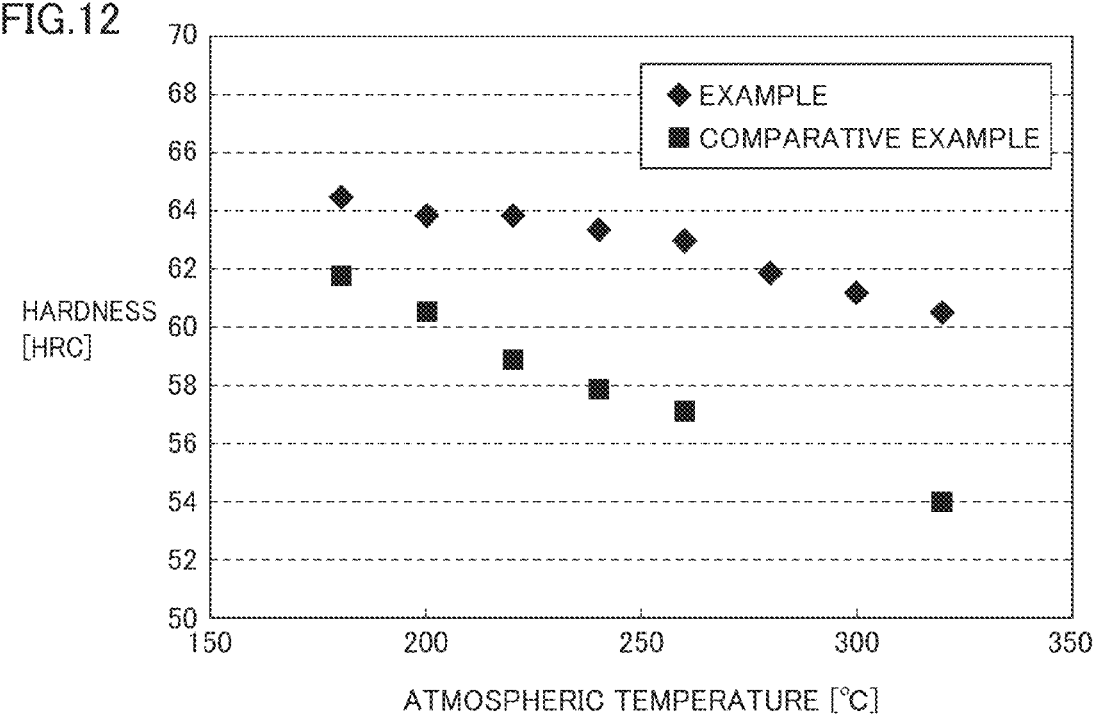
FIG. 12 is a diagram showing the relation between the atmospheric temperature and the hardness of a large collar surface of an inner ring.

Referring to FIG. 12, in Example, the hardness of the large collar surface of the inner ring was relatively high and a decrease in hardness due to a rise in the atmospheric temperature was relatively suppressed, as compared with Comparative Example. This is because high-concentration nitrogen was solid-dissolved in each of the surface layer portion under the large collar surface of the inner ring and the surface layer portion under the large diameter end face of the tapered roller, thereby stabilizing the retained austenite, with the result that the temper softening resistance was improved.

Example 3

Figure 13:
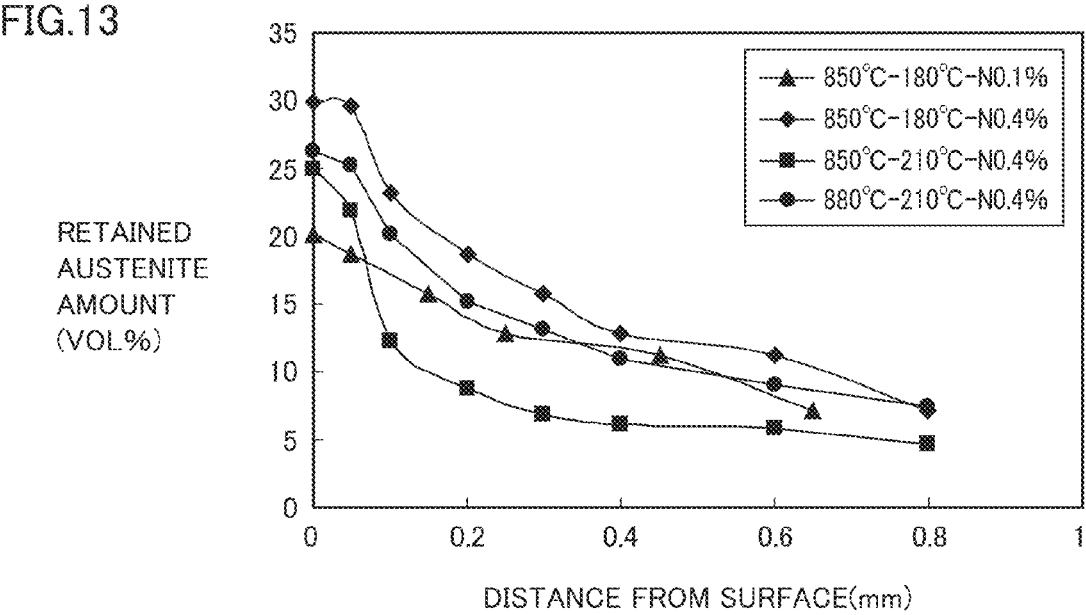
FIG. 13 is a diagram showing distribution of the retained austenite amount in the vicinity of a surface.
Figure 14:
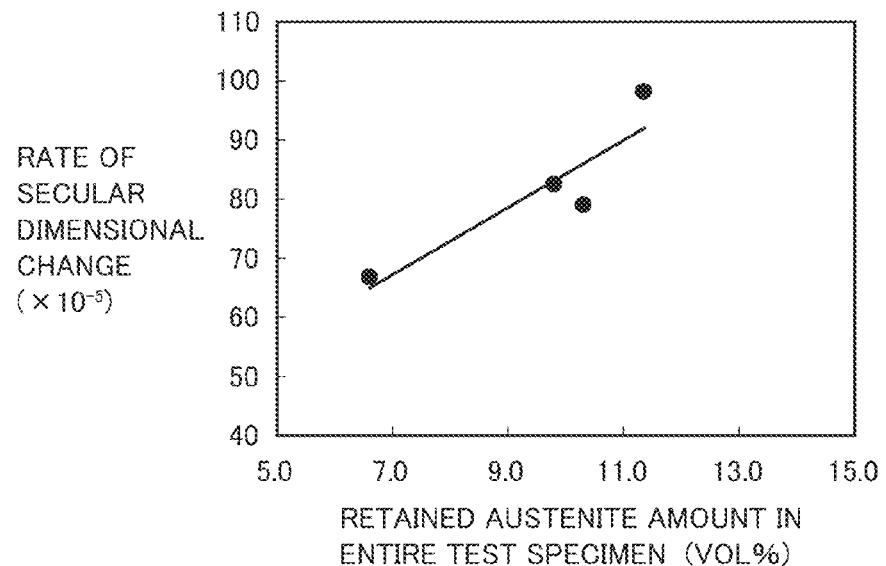
FIG. 14 is a diagram showing the relation between the retained austenite amount and the rate of secular dimensional change.

The experiment was conducted for examining the influence of the retained austenite amount upon the secular dimensional change. SUJ2 was used as a base material to produce a ring-shaped test specimen having an outer diameter (φ) of 60 mm, an inner diameter (φ) of 54 mm and a width (t) of 15 mm while changing the quenching temperature, the tempering temperature, and the nitrogen concentration in the surface layer portion. This test specimen was subjected to a heat treatment during which it was heated to 230° C. and held for 2 hours. Then, the dimensional difference in the outer diameter between before and after the heat treatment was divided by the outer diameter before heat treatment, thereby calculating the rate of secular dimensional change. The results of the test are shown in Table 2. Also, FIG. 13 shows the distribution of the retained austenite amount in the above-described test specimen. The average value within the test specimen was calculated from the distribution of the retained austenite amount in FIG. 13, and also, the relation with the rate of secular dimensional change of the corresponding test specimen previously calculated was examined. FIG. 14 shows the relation between the average retained austenite amount in the entire test specimen and the rate of secular dimensional change.

TABLE 2

| | Heat Treatment | | | |
|---|---|---|---|---|
| Steel Type | Quenching Temperature (° C.) | Tempering Temperature (° C.) | Surface Layer Nitrogen Concentration (mass %) | Rate of Secular Dimensional Change ($\times 10^5$) |
| SUJ2 | 850 | 180 | 0.0 | 53.6 |
| | 850 | 180 | 0.1 | 82.5 |
| | 850 | 180 | 0.4 | 98.1 |
| | 850 | 210 | 0.4 | 66.8 |
| | 880 | 210 | 0.4 | 78.9 |

Referring to Table 2 and FIG. 14, it is confirmed that the tempering temperature is raised to 210° C. to reduce the average retained austenite amount in the entire test specimen, so that the rate of secular dimensional change can be lowered. It is also found that it is effective that the average retained austenite amount is set at 20 vol % or less, preferably 15 vol % or less from the viewpoint of lowering the rate of secular dimensional change, and particularly, that the average retained austenite amount is set at 11 vol % or less so that the rate of secular dimensional change can be lowered to less than $100 \times 10^{-5}$.

Example 4

Figure 15:
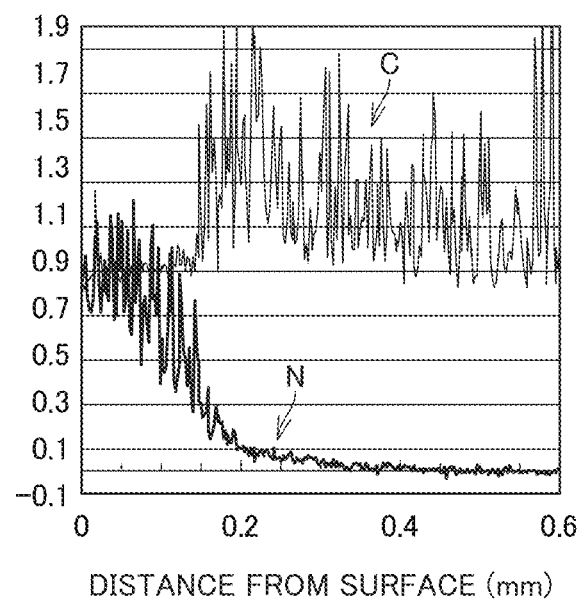
FIG. 15 is a diagram showing the concentration distributions of carbon and nitrogen in the vicinity of the surface.
Figure 16:
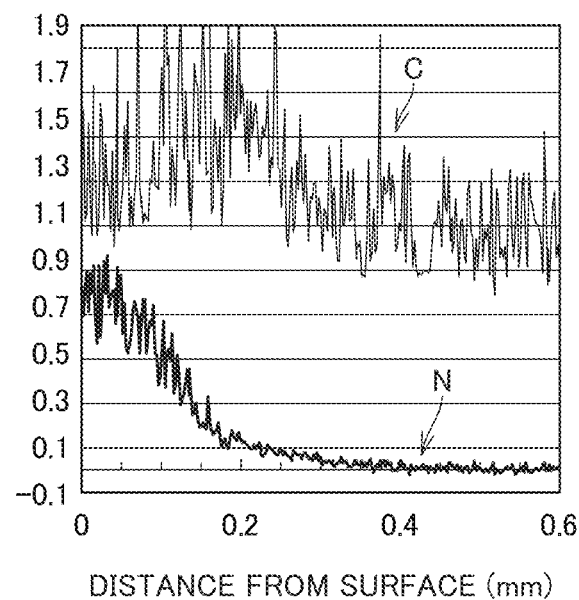
FIG. 16 is a diagram showing the concentration distributions of carbon and nitrogen in the vicinity of the surface.

The experiment was conducted for examining the distribution state of carbonitrides in the surface layer portion under the contact surface. Through a similar procedure to that in the above-described embodiment, a test specimen made of SUJ2 was produced under the conditions that disappearance of carbide due to its solid dissolution was suppressed by adjusting the carbon activity during the carbonitriding process. Specifically, the quenching temperature was set at 850° C., the tempering temperature was set at 180° C., and the nitrogen concentration in the surface layer portion was set at 0.3 mass % (condition 1). For the purpose of comparison, a test specimen was produced similarly under the condition that decarbonization occurred in the vicinity of the surface (Comparative Example). FIGS. 15 and 16 each show the carbon concentration distribution and the nitrogen concentration distribution in the vicinity of the surface in a test specimen of each of Condition 1 and Comparative Example, respectively.

Figure 17:
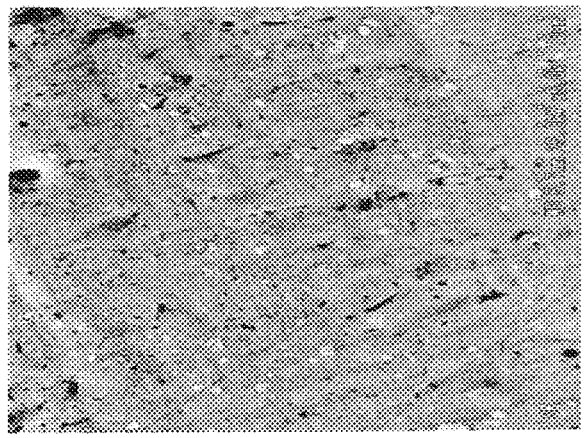
FIG. 17 is an SEM photograph of a surface of a test specimen.
Figure 18:
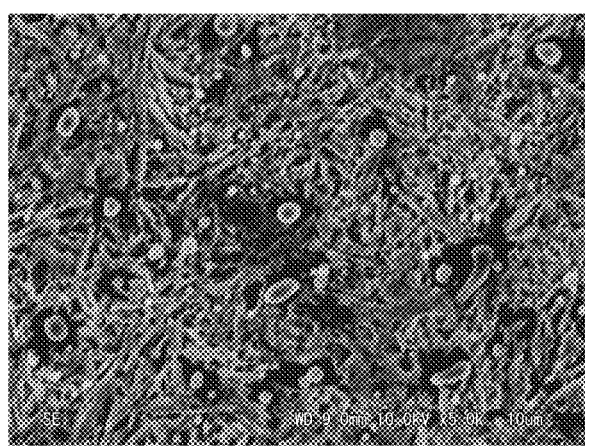
FIG. 18 is an SEM photograph of the surface of the test specimen.
Figure 19:
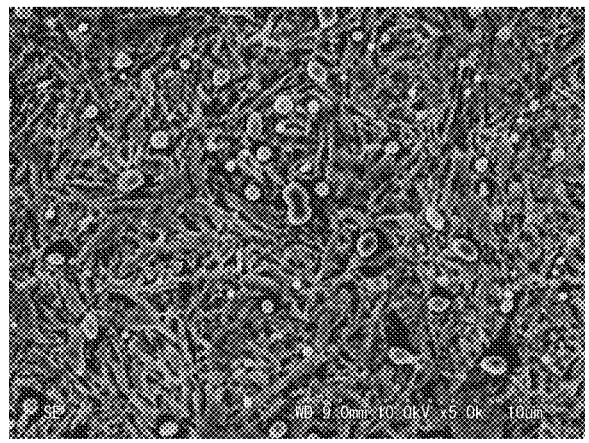
FIG. 19 is an SEM photograph of the surface of the test specimen.
Figure 20:
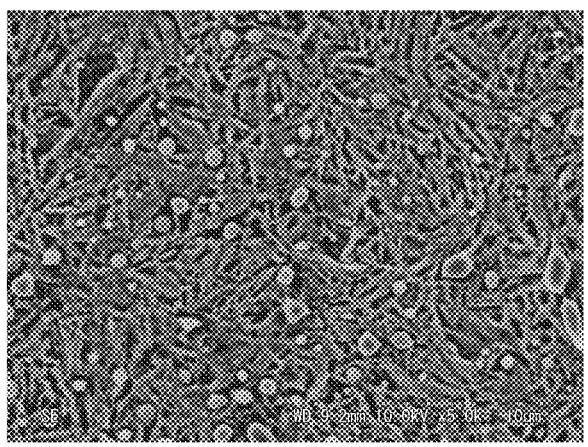
FIG. 20 is an SEM photograph of the surface of the test specimen.

Referring to FIGS. 15 and 16, in the test specimen of Comparative Example, the carbon concentration in the vicinity of the surface decreases and decarbonization is observed. In contrast, in the test specimen of Condition 1, the carbon concentration in the vicinity of the surface is kept at a level almost equivalent to that on the inside thereof. FIGS. 17 and 18 show an SEM photograph of the surface layer portion in Comparative Example and an SEM photograph of the surface layer portion in Condition 1, respectively. Furthermore, FIGS. 19 and 20 each show an SEM photograph of the surface layer portion of the test specimen (Condition 2) for which the quenching temperature is set at 880° C., the tempering temperature is set at 210° C. and the nitrogen concentration in the surface layer portion is set at 0.3 mass %.

As to Conditions 1 and 2, the number of carbonitrides each having a diameter of 0.5 μm or less that were considered to contribute to precipitation strengthening was calculated based on the SEM photograph in the surface layer portion (the SEM photograph of a cross section perpendicular to the surface). The calculation results are shown in Table 3.

TABLE 3

| Quenching Temperature (° C.) | Tempering Temperature (° C.) | Nitrogen Concentration (mass %) | Number | Number of Carbides |
|---|---|---|---|---|
| 850 | 180 | 0.3 | 1 | 16.5 |
| | | | 2 | 12.4 |
| | | | 3 | 12.9 |
| | | | Average | 13.9 |
| 880 | 210 | 0.3 | 1 | 6.5 |
| | | | 2 | 8.6 |
| | | | 3 | 5.4 |
| | | | Average | 6.8 |

Each test specimen was examined 3 times (at 3 portions) with regard to the number of carbonitrides existing in a region within a range of 100 μm², to calculate the average value. As shown in Table 3, it was confirmed on Conditions 1 and 2 that five or more carbonitrides each having a diameter of 0.5 μm or less were present within a range of 100 μm².

Example 5

The experiment was conducted for examining a reduction in torque of the tapered roller bearing by a holder. A tapered roller bearing using holder 20 shown in FIG. 2 (Example 1) and a tapered roller bearing using holder 20 shown in FIG. 4 (Example 2) were prepared. Also for the purpose of comparison, a tapered roller bearing using a holder having a pocket not provided with a cutout (Comparative Example 1) and a tapered roller bearing using a holder having a pocket not provided with a cutout at its column portion on the reduced width side (Comparative Example 2) were prepared. The tapered roller bearings each have dimensions of an outer diameter of 100 mm, an inner diameter of 45 mm and a width of 27.25 mm, and are identical in configuration of the pocket except for a cutout.

Figure 21:
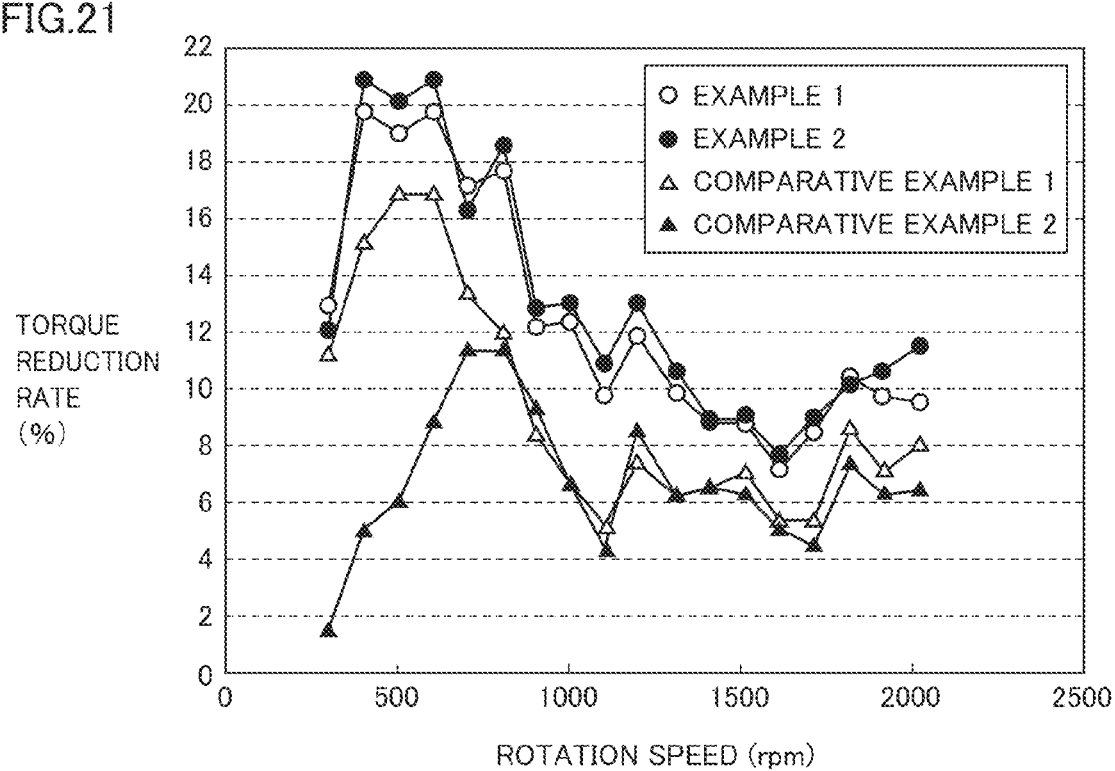
FIG. 21 is a graph showing the result of a torque measurement test.

The tapered roller bearings of Example and Comparative Example as described above were subjected to a torque measurement test using a vertical-type torque test machine. The axial load was set at 300 kgf in this test. The rotation speed was set at 300 rpm to 2000 rpm (100-rpm pitch). As a lubricating oil, 75W-90 was used to carry out dip-feed lubrication. FIG. 21 shows the results of the above-described torque measurement test. In FIG. 21, the vertical axis shows the torque reduction rate to the torque in Comparative Example 1 using a holder having a pocket not provided with a cutout. The torque reduction effect is observed also in Comparative Example 2 in which the pocket is provided with a cutout in its center portion of the column portion. In Example 1 in which the pocket is provided with a cutout in its column portion on the reduced width side, however, a more excellent torque reduction effect than that in this Comparative Example is observed. In Example 2 in which a cutout is provided also in the small annular portion on the reduced width side and the total area of each cutout on the reduced width side is larger than that on the increased width side, a further more excellent torque reduction effect is observed.

Furthermore, the torque reduction rate measured at 2000 rpm that is the highest rotation speed in the test is 9.5% in Example 1 and 11.5% in Example 2. Thus, an excellent torque reduction effect can be achieved also under the use conditions during high speed rotation of a differential, a transmission or the like. In addition, the torque reduction rate at a rotation speed of 2000 rpm in Comparative Example 2 is 8.0%.

Example 6

Figure 22:
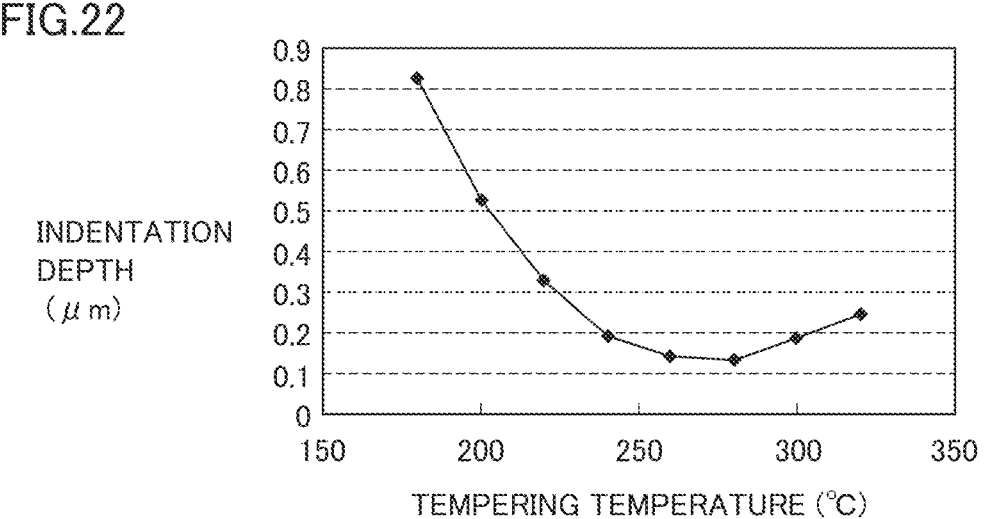
FIG. 22 is a diagram showing the relation between the tempering temperature and the indentation depth.

The experiment was conducted for examining the influence of the heat treatment condition and the like upon the characteristics of the bearing component. First, a flat plate made of SUJ2 defined by the JIS standards was prepared. After this flat plate was pre-heated at 800° C. for 1 hour, it was heated to 850° C. in an atmosphere obtained by adding ammonia gas to RX gas and then held for 4 hours so as to be carbonitrided. Then, the flat plate, which was held at a heating temperature of 850° C. in the carbonitriding process, was immersed in the quenching oil so as to be quench-hardened. Furthermore, this flat plate was subjected to a tempering process at various temperatures. A steel ball for standard rolling bearing made of SUJ2 having a diameter of 19.05 mm was pressed against the obtained flat plate at a load of 3.18 kN (the maximum contact surface pressure of 4.4 GPa), and held for 10 seconds, which was then unloaded. Then, the indentation resistance was examined by measuring the depth of the indentation formed in the flat plate by pressing this steel ball against this plate. Furthermore, the surface hardness of the same test specimen was measured using a Rockwell hardness tester. FIG. 22 shows the examination results of the indentation resistance and FIG. 23 shows the hardness measurement results.

Figure 23:
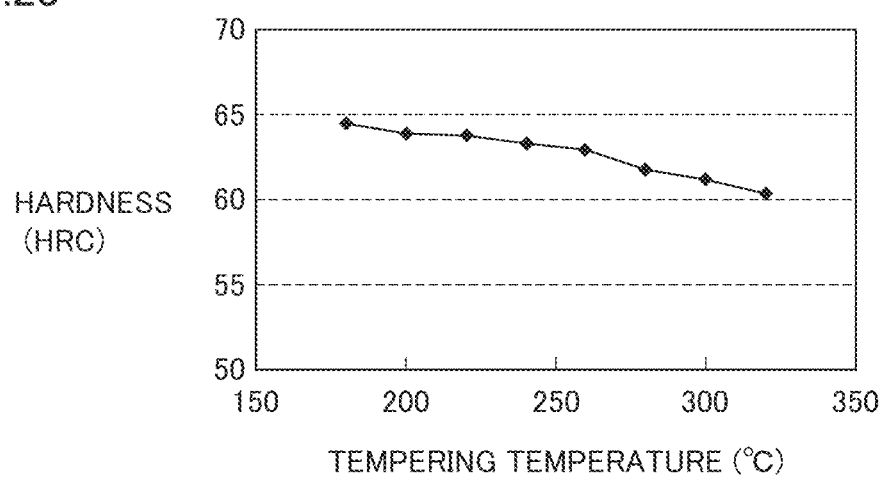
FIG. 23 is a diagram showing the relation between the tempering temperature and the hardness.

Referring to FIGS. 22 and 23, the surface hardness lowers in accordance with a rise in the tempering temperature while the indentation depth exhibits a minimum value. Specifically, by setting the tempering temperature at 240° C. or more and 300° C. or less, the indentation depth is 0.2 μm or less. Based on this result, the tempering temperature is preferably set at 240° C. or more and 300° C. or less from the viewpoint of improving the indentation resistance.

It is considered that the optimum value of the above-described tempering temperature is determined as set forth below. When the quenching process is performed, carbon is solid-dissolved in the base material of steel. On the other hand, when the tempering process is performed, part of carbon that is solid-dissolved in the base material precipitates as carbide (for example, $Fe_3C$). In this case, as the tempering process temperature rises, contribution of solid dissolution strengthening to the yield strength of steel is decreased and contribution of precipitation strengthening is increased. Then, when the tempering process is performed in a temperature range of 240° C. or more and 300° C. or less, the balance between these strengthening mechanisms is optimized, and the yield strength exhibits a maximum value. Accordingly, the indentation resistance is considerably increased.

Irrespective of a monotonous decrease in the surface hardness measured based on deformation of steel caused by pressing of indentations similarly to the case of measuring the indentation depth described above, the indentation resistance exhibits a maximum value, the reason of which is considered as will be described below.

Figure 24:
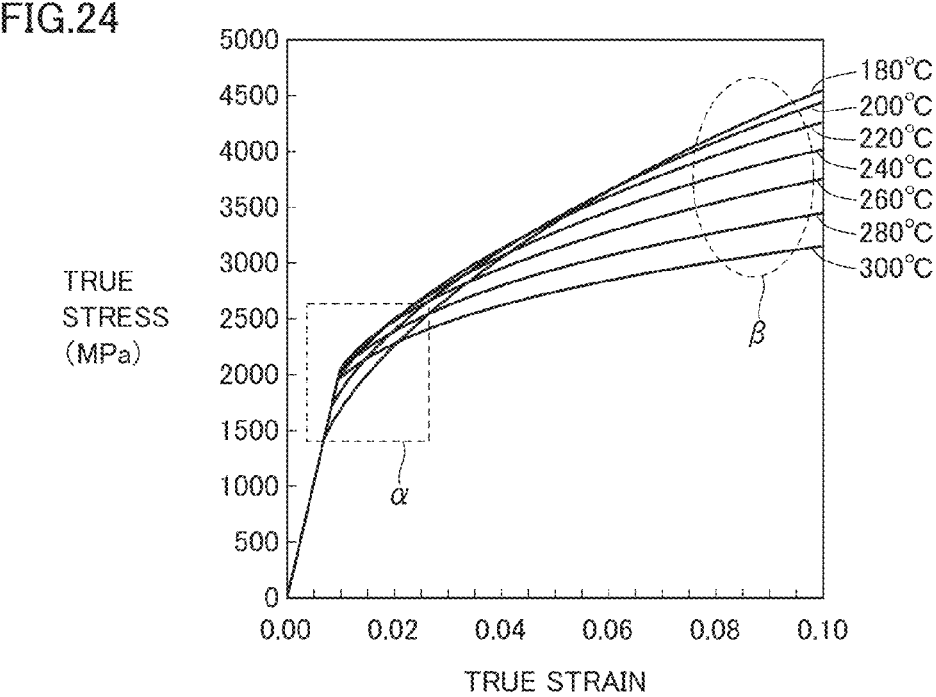
FIG. 24 is a diagram showing the relation between the true strain and the true stress.

FIG. 24 is a diagram showing the relation between the true stress and the true strain in a tension test (JIS Z2201 No. 4 test specimen) in which processes excluding only a carbonitriding process were conducted under the above-described heat treatment conditions at each of the above-described tempering temperatures. FIG. 24 is a true stress-true strain diagram modeled by the n-th power hardened elasto-plastic body. Characteristics vary at a $\sigma_Y$ yield stress as a boundary, as in the following equation.

$$\sigma = E\epsilon \quad (\sigma < \sigma_Y)$$

$$\sigma = K\epsilon^n \quad (\sigma \geq \sigma_Y) \quad \text{[Equation 1]}$$

In this case, σ shows a true stress, E shows a Young's modulus, ε shows a true strain, K shows a plasticity coefficient, n shows a work hardening exponent, and σY shows a yield stress. It is to be noted that Young's modulus E was actually measured by the resonance method while the work hardening exponent n and composition coefficient K were actually measured by the tension test. Then, these values were substituted into the above-described two equations, and the intersection point was defined as σY.

Figure 25:
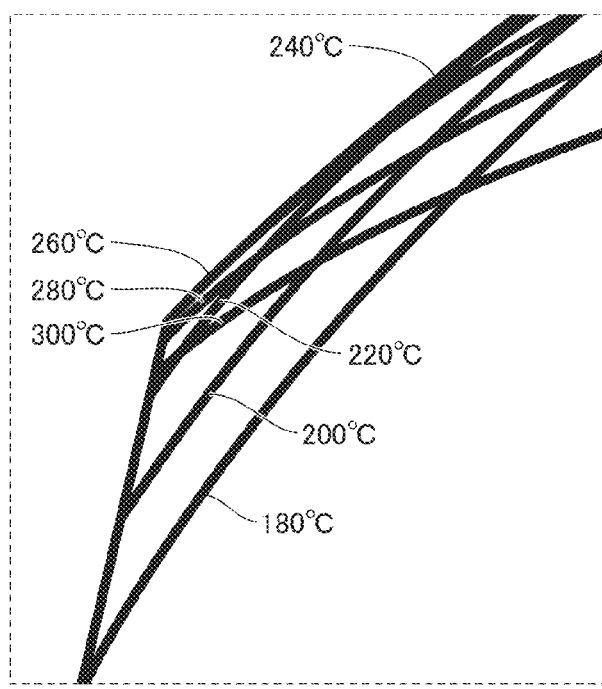
FIG. 25 is a diagram showing, in an enlarged manner, a region α in FIG. 24.

In this case, the level of the true strain in measurement of the indentation depth corresponds to a region α in FIG. 24, whereas the level of the true strain in measurement of the hardness corresponds a region β or more in FIG. 24. Then, referring to FIG. 25, upon observation of the yield point in region α corresponding to the measurement region of the indentation depth, the yield point is relatively high at a tempering temperature in a range of 240° C. to 300° C. In the case where the tempering temperature is lower than this temperature range, the yield point lowers. On the other hand, referring to FIG. 24, upon observation of a region β corresponding to a measurement region of the surface hardness, it is found that a larger stress is required as the tempering temperature becomes lower if the same strain amount is to be applied. It is considered that, due to the above-described phenomenon, the indentation resistance is improved by setting the tempering temperature at 240° C. to 300° C. even though the hardness decreases as compared with the case where the tempering temperature is set at 180° C. to 220° C.

The test specimen heat-treated under the conditions where the tempering temperature as well as the surface nitrogen concentration and the quenching temperature were changed was examined with regard to the retained austenite amount in the surface, the indentation depth, the life, the ring crushing strength, and the rate of secular change.

In this case, the indentation depth was measured in the same manner as in the above-described case. The indentation depth of less than 0.2 μm was evaluated as B; the indentation depth of 0.2 μm to 0.4 μm was evaluated as C; and the indentation depth of 0.4 μm or more was evaluated as D. The life was examined while imitating the loading condition applied when the bearing was used for a transmission, under the conditions that an oil film parameter reached 0.5 under pure oil lubrication, after indentation was formed on the raceway surface under the conditions similar to those applied when measuring the indentation depth. Then, based on the condition that the life of the test specimen obtained at a quenching temperature of 850° C., a tempering temperature of 240° C. and a surface nitrogen amount of 0.4 mass % was defined as a reference (B), the life longer than the reference life was evaluated as A; the life shorter than the reference life was evaluated as C; and the life significantly shorter than the reference life was evaluated as D. The ring crushing strength was evaluated in the following manner. Specifically, a ring was produced to have an outer diameter of 60 mm, an inner diameter of 54 mm and a width of 15 mm, and then compressed by a flat plate in the radial direction. Then, the load at which cracking occurred in the ring was examined for evaluation. The case where the load at which cracking occurred was 5000 kgf or more was evaluated as A; the case where the load at which cracking occurred was 3500 kgf to 5000 kgf was evaluated as B; and the case where the load at which cracking occurred was less than 3500 kgf was evaluated as D. Furthermore, the rate of secular change was evaluated by measuring the amount of change, from before the heat treatment, in the outer diameter dimension of the test specimen having been held at 230° C. for 2 hours. The change amount of $10.0 \times 10^5$ or less was evaluated as A; the change amount of $10.0 \times 10^5$ to $30.0 \times 10^5$ was evaluated as B; the change amount of $30.0 \times 10^5$ to $90.0 \times 10^5$ was evaluated as C; and the change amount of $90.0 \times 10^5$ or more was evaluated as D. The test results are shown in Table 4.

TABLE 4

| Surface Nitrogen Concentration (mass %) | Quenching Temperature (° C.) | Tempering Temperature (° C.) | Retained Austenite (vol %) | Indentation Depth (μm) | Evaluation | Life | Ring Crushing Strength (kgf) | Evaluation | Rate of Secular Change ×10$^5$ | Evaluation |
|---|---|---|---|---|---|---|---|---|---|---|
| 0.4  | 850 | 240 | 8.6  | 0.138 | B | A | 3657 | B | 2.5  | A |
| 0.25 | 820 | 240 | 6.5  | 0.118 | B | B | 5403 | A | -1.9 | A |
| 0.25 | 850 | 240 | 7.7  | 0.128 | B | B | 3923 | B | 0.6  | A |
| 0.1  | 820 | 240 | 6.0  | 0.179 | B | D | 5153 | A | -2.5 | A |
| 0.1  | 850 | 240 | 3.7  | 0.132 | B | D | 4643 | A | 0.8  | A |
| 0.4  | 850 | 180 | 22.9 | 0.485 | D | C | 4083 | B | 98.1 | D |
| 0.4  | 880 | 240 | 10.2 | 0.234 | C | C | 3040 | D | 6.6  | A |
| 0.4  | 880 | 210 | 26.3 | 0.559 | D | C | 3170 | D | 65.3 | C |
| 0.4  | 820 | 210 | 26.0 | 0.318 | C | C | 6407 | A | 49.1 | C |
| 0.25 | 880 | 240 | 10.9 | 0.232 | C | B | 3300 | D | 8.6  | A |
| 0.25 | 880 | 180 | 31.0 | 0.686 | D | D | 3123 | D | 93.8 | D |
| 0.25 | 850 | 210 | 24.2 | 0.384 | C | C | 4147 | B | 63.3 | C |
| 0.25 | 820 | 210 | 20.5 | 0.271 | C | C | 6500 | A | 44.7 | C |
| 0.1  | 880 | 210 | 20.1 | 0.499 | D | D | 4157 | B | 70.0 | C |
| 0.1  | 850 | 210 | 12.9 | 0.304 | C | D | 5057 | A | 63.2 | C |
| 0.1  | 820 | 210 | 14.4 | 0.261 | B | D | 5913 | A | 48.6 | C |
| 0.1  | 880 | 180 | 30.8 | 0.567 | D | D | 4233 | B | 93.7 | D |

Referring to Table 4, excellent evaluations in all of the above-described items were obtained in each test specimen satisfying all of the conditions that the surface nitrogen concentration was 0.25 mass % to 0.5 mass %, the quenching temperature was 820° C. to 860° C. and the tempering temperature was 240° C. to 300° C.

Example 7

The experiment was conducted for more specifically examining the indentation resistance and the rolling fatigue life of the tapered roller bearing.

(Indentation Resistance Test)

A member of model number 30206 defined by the JIS standards was used in the test. An inner ring, an outer ring and a tapered roller made of SUJ2 material defined by the JIS standards were prepared, and subjected sequentially to a carbonitriding process, a quenching process, and a tempering process. The quenching temperature was set at 850° C., the tempering temperature was set at 240° C., and the nitrogen concentration in the surface layer portion was set at 0.4 mass % (Example). Furthermore, for the purpose of comparison, an examination was conducted for the inner ring, the outer ring and the tapered roller for which a carbonitriding process was not conducted and the tempering temperature was set to be relatively low (Comparative Example). In this case, the quenching temperature was set at 850° C., the tempering temperature was set at 180° C., and the nitrogen concentration in the surface layer portion was set at 0 mass %. Then, the indentation depth was examined, which was obtained when a load of 4.5 GPa was applied to the raceway surface of the inner ring and the rolling surface of the tapered roller.

In Comparative Example, the indentation depth of the inner ring raceway surface was 0.42 µm to 0.53 µm (at an average of 0.45 µm per ten pieces), and the indentation depth of the rolling surface was 0.23 µm to 0.44 µm (at an average of 0.3 µm per ten pieces). On the other hand, in Example, the indentation depth of the inner ring raceway surface was 0.11 µm to 0.23 µm (at an average of 0.14 µm per ten pieces), and the indentation depth of the rolling surface was 0.05 µm to 0.12 µm (at an average of 0.73 µm per ten pieces).

(Rolling Fatigue Life Test)

A member of model number 30206 defined by the JIS standards was used in the test. An inner ring, an outer ring and a tapered roller made of SUJ2 material defined by the JIS standards were prepared, and subjected sequentially to a carbonitriding process, a quenching process, and a tempering process. The quenching temperature was set at 850° C., the tempering temperature was set at 240° C., and the nitrogen concentration in the surface layer portion was set at 0.405 mass % (Example). Furthermore, for the purpose of comparison, an examination was conducted for the inner ring, the outer ring and the tapered roller for which the carbonitriding process was not conducted and the tempering temperature was set to be relatively low (Comparative Example). In this case, the quenching temperature was set at 850° C., the tempering temperature was set at 180° C., and the nitrogen concentration in the surface layer portion was set at 0 mass %. In the test, a load was applied to set the P/C (load/load capacity) at 0.4, and the contact pressure on the inner ring raceway surface was set at 2.5 GPa. ATF having a kinematic viscosity of 30 mm$^2$/s (40° C.) was used as lubricating oil. Hard foreign substances (800 HV) each having a particle size of 100 µm to 180 µm were mixed into the lubricating oil (1.0 g/L).

The life was measured as 49.5 h to 96.5 h ($L_{10}$ life=41.2 h when ten pieces were used) in Comparative Example, whereas the life was measured as 53.1 h to 113.2 h ($L_{10}$=51.0 h when six pieces were used) in Example.

It should be understood that the embodiments and examples disclosed herein are illustrative and non-restrictive in every respect. The scope of the present invention is defined by the terms of the claims, rather than the description above, and is intended to include any modifications within the meaning and scope equivalent to the terms of the claims.

INDUSTRIAL APPLICABILITY

The tapered roller bearing of the present invention is particularly advantageously applicable to a tapered roller bearing that needs to be improved in seizure resistance and increased in life.

REFERENCE SIGNS LIST 1A, 1B tapered roller bearing, 120A, 120B rolling bearing, 130 thrust needle roller bearing, 11a, 31a outer ring rolling contact surface, 12a, 32a inner ring rolling contact surface, 11, 31 outer ring, 12, 32 inner ring, 12b, 32b small collar, 12b1, 32b1 small collar surface, 12c, 32c large collar, 12c1, 32c1 large collar surface, 12d, 32d inner diameter surface, 13a, 33a rolling surface, 13b, 33b small diameter end face, 13c, 33c large diameter end face, 14 collar, 20, 40 holder, 21 small annular portion, 22 large annular portion, 23 column portion, 24 pocket, 100 manual transmission, 111 input shaft, 112 output shaft, 113 counter shaft, 114a to 114k gear, 115 housing, 200 differential, 201, 208 differential case, 201a tooth, 201b external tooth, 202a, 202b pinion gear, 202c, 202d rotation shaft, 203 sun gear, 204 pinion carrier, 205 armature, 206 pilot clutch, 207 electromagnet, 209 cam, 220 left drive shaft, 221 right drive shaft.

The invention claimed is:

1. A tapered roller bearing comprising:
   an outer ring having an outer ring rolling contact surface on an inner circumferential surface;
   an inner ring having an inner ring rolling contact surface on an outer circumferential surface, having a small collar and a large collar formed on both sides of said inner ring rolling contact surface, and arranged on an inner side of said outer ring;
   a plurality of tapered rollers arranged between said outer ring rolling contact surface and said inner ring rolling contact surface; and
   a holder having a pocket housing each of said tapered rollers,
   at least one of bearing components including said outer ring, said inner ring and said tapered roller being made of steel consisting of 0.6 mass % or more and 1.50 mass % or less of carbon, 0.15 mass % or more and 2.50 mass % or less of silicon, 0.30 mass % or more and 1.50 mass % or less of manganese, and 0.20 mass % or more and 2.00 mass % or less of chromium, with the rest made up of iron, unavoidable impurities, and a nitrogen concentration in a surface layer portion under a contact surface in contact with another component being 0.3 mass % or more,
   said holder including a small annular portion continuously extending on a side of a small diameter end face of said tapered roller, a large annular portion continuously extending on a side of a large diameter end face of said tapered roller, and a plurality of column portions coupling said small annular portion and said large annular portion,
   said pocket having a trapezoidal shape in which a portion housing a small diameter side of said tapered roller is located on a reduced width side while a portion housing a large diameter side of said tapered roller is located on an increased width side, and
   each of said column portions on said reduced width side of said pocket being provided with a cutout.

2. The tapered roller bearing according to claim 1, wherein
   said large collar includes a large collar surface that is in sliding contact with said large diameter end face of said tapered roller, and
   the nitrogen concentration in each of said surface layer portion under said large diameter end face and said surface layer portion under said large collar surface is 0.3 mass % or more.

3. The tapered roller bearing according to claim 1, wherein
   in at least one of the bearing components including said outer ring, said inner ring and said tapered roller, said surface layer portion under said contact surface includes five or more carbonitrides each having a diameter of 0.5 μm or less that are present per 100 μ2 in a cross section perpendicular to said contact surface.

4. The tapered roller bearing according to claim 1, wherein
in at least one of the bearing components including said outer ring, said inner ring and said tapered roller, a retained austenite amount in a region extending from said contact surface to a depth of 50 μm is 20 vol % or more.

5. The tapered roller bearing according to claim 1, wherein
a nitrogen concentration in an inner diameter surface of said inner ring is 0.05 mass % or less.

6. The tapered roller bearing according to claim 1, wherein
said tapered roller bearing supports a rotation member, which rotates within a differential or a transmission, so as to be rotatable relative to another member arranged adjacent to said rotation member.

7. The tapered roller bearing according to claim 1, wherein
a small annular portion on the reduced width side of said pocket is provided with a cutout.

8. The tapered roller bearing according to claim 1, wherein
each said column portion on the increased width side of said pocket is provided with a cutout.

9. The tapered roller bearing according to claim 8, wherein
a total area of the cutout provided in each said column portion on the reduced width side of said pocket is greater than a total area of said cutout provided in each said column portion on said increased width side of said pocket.

10. The tapered roller bearing according to claim 1, wherein the small annular portion of said holder is provided with a collar facing said small collar of said inner ring, and
a gap between said collar of said small annular portion and said small collar of said inner ring is 2.0% or less of an outer diameter of said small collar of said inner ring.

11. The tapered roller bearing according to claim 1, wherein said tapered roller has a surface provided with a recess formed in a concave shape, and
said surface of said tapered roller has a surface roughness (Ryni) of 0.4 μm or more and 1.0 μm or less, and an Sk value of −1.6 or less.

12. A tapered roller bearing comprising:
an outer ring having an outer ring rolling contact surface on an inner circumferential surface;
an inner ring having an inner ring rolling contact surface on an outer circumferential surface, having a small collar and a large collar formed on both sides of said inner ring rolling contact surface, and arranged on an inner side of said outer ring;
a plurality of tapered rollers arranged between said outer ring rolling contact surface and said inner ring rolling contact surface; and
a holder having a pocket housing each of said tapered rollers,
at least one of bearing components including said outer ring, said inner ring and said tapered roller being made of steel containing 0.6 mass % or more and 1.50 mass % or less of carbon, 0.15 mass % or more and 2.50 mass % or less of silicon, 0.30 mass % or more and 1.50 mass % or less of manganese, and 0.20 mass % or more and 2.00 mass % or less of chromium, and further containing at least one of 0.5 mass % or less of nickel and 0.2 mass % or less of molybdenum, with the rest made up of iron, unavoidable impurities, and a nitrogen concentration in a surface layer portion under a contact surface in contact with another component being 0.3 mass % or more,
said holder including a small annular portion continuously extending on a side of a small diameter end face of said tapered roller, a large annular portion continuously extending on a side of a large diameter end face of said tapered roller, and a plurality of column portions coupling said small annular portion and said large annular portion,
said pocket having a trapezoidal shape in which a portion housing a small diameter side of said tapered roller is located on a reduced width side while a portion housing a large diameter side of said tapered roller is located on an increased width side,
each of said column portions on said reduced width side of said pocket being provided with a cutout,
at least one of the bearing components including said outer ring, said inner ring, and said tapered roller has an entire average retained austenite amount of 20 vol % or less.

13. A tapered roller bearing comprising:
an outer ring having an outer ring rolling contact surface on an inner circumferential surface;
an inner ring having an inner ring rolling contact surface on an outer circumferential surface, having a small collar and a large collar formed on both sides of said inner ring rolling contact surface, and arranged on an inner side of said outer ring;
a plurality of tapered rollers arranged between said outer ring rolling contact surface and said inner ring rolling contact surface; and
a holder having a pocket housing each of said tapered rollers,
at least said tapered roller among said outer ring, said inner ring and said tapered roller being made of quench-hardened steel containing 0.90 mass % or more and 1.05 mass % or less of carbon, 0.15 mass % or more and 0.35 mass % or less of silicon, 0.01 mass % or more and 0.50 mass % or less of manganese, and 1.30 mass % or more and 1.65 mass % or less of chromium, with the rest made up of iron, unavoidable impurities, and a nitrogen concentration in a contact surface that is in contact with another component being 0.25 mass % or more, wherein a retained austenite amount in said contact surface is 6 vol % or more and 12 vol % or less.

14. The tapered roller bearing according to claim 13, wherein
said holder includes a small annular portion continuously extending on a side of a small diameter end face of said tapered roller, a large annular portion continuously extending on a side of a large diameter end face of said tapered roller, and a plurality of column portions coupling said small annular portion and said large annular portion,
said pocket has a trapezoidal shape in which a portion housing a small diameter side of said tapered roller is located on a reduced width side while a portion housing a large diameter side of said tapered roller is located on an increased width side, and
each of said column portions on said reduced width side of said pocket is provided with a cutout.

15. The tapered roller bearing according to claim 13, wherein
said contact surface of at least said tapered roller among said outer ring, said inner ring and said tapered roller has a hardness of 60.0 HRC or more.

16. The tapered roller bearing according to claim 13, wherein
said contact surface of at least said tapered roller among said outer ring, said inner ring and said tapered roller has a hardness of 64.0 HRC or less.

* * * * *